(12) United States Patent
Singh et al.

(10) Patent No.: US 12,743,156 B2
(45) Date of Patent: Sep. 22, 2026

(54) SYSTEMS, DEVICES AND METHODS FOR NEUROFEEDBACK TO PROMOTE BRAIN COHERENCE

(71) Applicant: The Regents of the University of California, Oakland, CA (US)

(72) Inventors: Fiza Singh, La Jolla, CA (US); I-Wei Shu, La Jolla, CA (US); Sheng-Hsiou Hsu, La Jolla, CA (US); Yayu Lin, La Jolla, CA (US); Eric Granholm, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 19/108,140

(22) PCT Filed: Sep. 1, 2023

(86) PCT No.: PCT/US2023/073362

§ 371 (c)(1),
(2) Date: Feb. 28, 2025

(87) PCT Pub. No.: WO2024/050545

PCT Pub. Date: Mar. 7, 2024

(65) Prior Publication Data

US 2025/0355495 A1 Nov. 20, 2025

Related U.S. Application Data

(60) Provisional application No. 63/374,509, filed on Sep. 2, 2022.

(51) Int. Cl.
*G06F 3/01* (2006.01)

(52) U.S. Cl.
CPC .................................. *G06F 3/015* (2013.01)

(58) Field of Classification Search
CPC ...................................................... G06F 3/015
See application file for complete search history.

(56) References Cited

U.S. PATENT DOCUMENTS

2018/0021579 A1* 1/2018 Kahana ............. A61N 1/36082 607/45
2019/0159715 A1 5/2019 Mishra Ramanathan et al.
(Continued)

OTHER PUBLICATIONS

Barr, M.S. et al., "Evidence for excessive frontal evoked gamma oscillatory activity in schizophrenia during working memory", Schizophrenia Research, vol. 131, 2010, pp. 146-152.
(Continued)

*Primary Examiner* — Chun-Nan Lin
(74) *Attorney, Agent, or Firm* — Ashurst Perkins Coie US LLP

(57) ABSTRACT

Disclosed are devices, systems and methods for acquiring, analyzing, and utilizing neurofeedback to promote brain coherence. Neurofeedback is a form of biofeedback that allows an individual to regulate his/her brain activity by providing a visual metaphor of brain function, thereby making it accessible for manipulation. In some embodiments of the present technology, a system includes a brain signal detection device wearable by a subject and a computer device including a display and a brain-computer interface (BCI) configured to monitor brain signals and display visual, auditory, and/or tactile stimuli to the subject according to a neurofeedback threshold-based protocol to deliver brain signal coherence between the left and right hemispheres of a subject's brain.

22 Claims, 13 Drawing Sheets

(56) References Cited

U.S. PATENT DOCUMENTS

| | | | | |
|---|---|---|---|---|
| 2021/0041953 | A1 * | 2/2021 | Poltorak | H04W 4/80 |
| 2021/0169417 | A1 | 6/2021 | Burton | |
| 2022/0168567 | A1 | 6/2022 | Hagedorn | |
| 2024/0074687 | A1 * | 3/2024 | Brunner | A61B 5/7225 |
| 2024/0261572 | A1 * | 8/2024 | Leuthardt | A61N 1/0456 |

OTHER PUBLICATIONS

Gaspar, P. et al., "P300 amplitude is insensitive to working memory load in schizophrenia", BMC Psychiatry, vol. 11, No. 29, 2011, pp. 1-6.

ISA, International Search Report and Written Opinion for International Application No. PCT/US2023/073362, mailed on Feb. 28, 2024, 15 pages.

Jaeggi, S. et al., "The concurrent validity of the N-back task as a working memory measure", Memory, vol. 18, No. 4, 2010, pp. 394-412.

Lin, Y. et al., "Novel EEG-Based Neurofeedback System Targeting Frontal Gamma Activity of Schizophrenia Patients to Improve Working Memory", Conference: 44th Annual International Conference of the IEEE Engineering in Medicine & Biology Society (EMBC), 2022, 5 pages.

Marzbani, H. et al., "Methodological Note: Neurofeedback: A Comprehensive Review on System Design, Methodology and Clinical Applications", Basic and Clinical Neuroscience, vol. 7, No. 2, 2016, pp. 143-158.

Shin, Y.W. et al., "Gamma Oscillation in Schizophrenia", Korean Neuropsychiatric Association, 2011, pp. 288-296.

Singh, F. et al., "Modulation of frontal gamma oscillations improves working memory in schizophrenia", NeuroImage: Clinical, vol. 27, 2020, pp. 1-7.

Singh, F. et al., "Revisiting the Potential of EEG Neurofeedback for Patients with Schizophrenia", Schizophrenia Bulletin, vol. 46, No. 4, 2020, pp. 741-742.

Sitaram, R. et al., "Closed-loop brain training: the science of neurofeedback", Nature Reviews, vol. 18, 2017, pp. 86-101.

Sur, S. et al., "Event-related potential: An overview", Industrial Psychiatry Journal, vol. 18, No. 1, 2009, pp. 70-73.

Uhlhaas, P.J. et al., "Abnormal neural oscillations and synchrony in schizophrenia", Nature Reviews, vol. 11, 2010, pp. 100-113.

Van Buuren, S., "Multiple imputation of discrete and continuous data by fully conditional specification", Statistical Methods in Medical Research, vol. 16, 2007, pp. 219-242.

Van Snellenberg, J. et al., "Mechanisms of Working Memory Impairment in Schizophrenia", Biological Psychiatry, vol. 80, 2016, pp. 617-626.

Williams, S. et al., "Gamma oscillations and schizophrenia", J Psychiatry Neurosci, vol. 35, No. 2, 2010, pp. 75-77.

* cited by examiner

SYSTEMS, DEVICES AND METHODS FOR NEUROFEEDBACK TO PROMOTE BRAIN COHERENCE

CROSS-REFERENCE TO RELATED APPLICATIONS

This patent document is a U.S.C. § 371 National Stage application of International Application No. PCT/US2023/073362, which claims the benefits and priority of U.S. Provisional Patent Application No. 63/374,509, titled "METHOD OF NEUROFEEDBACK TO PROMOTE BRAIN COHERENCE" and filed on Sep. 2, 2022. The entire contents of the aforementioned patent applications are incorporated by reference as part of the disclosure of this application.

STATEMENT REGARDING FEDERALLY SPONSORED RESEARCH OR DEVELOPMENT

This invention was made with government support under MH112793 awarded by the National Institutes of Health. The government has certain rights in the invention.

TECHNICAL FIELD

This patent document relates to a brain-computer interface.

BACKGROUND

Electroencephalography (EEG) is the recording of electrical activity exhibited by the brain using electrodes positioned on a subject's scalp, forming a spectral content of neural signal oscillations that comprise an EEG data set. For example, the electrical activity of the brain that is detected by EEG techniques can include voltage fluctuations, e.g., resulting from ionic current flows within the neurons of the brain. In some contexts, EEG refers to the recording of the brain's spontaneous electrical activity over a short period of time, e.g., less than an hour. EEG can be used in clinical diagnostic applications including epilepsy, coma, encephalopathies, brain death, and other diseases and defects, as well as in studies of sleep and sleep disorders. In some instances, EEG has been used for the diagnosis of tumors, stroke and other focal brain disorders.

SUMMARY

Disclosed are devices, systems, and methods for providing neurofeedback to promote brain coherence, which can improve memory and other forms of cognition and psychiatric symptoms. Neurofeedback is a form of biofeedback that allows an individual to regulate his/her brain activity using visual, auditory, and/or tactile stimuli to measure and analyze brain function, thereby making it accessible for manipulation to improve brain function and mental health. Brain coherence is when the neurophysiological signals (e.g., electrical activity) of regions of the brain are coordinated or synchronized. In some embodiments of the present technology, a system includes a brain signal detection device (e.g., EEG sensor device) wearable by a subject and a data processing and display device (e.g., computer and display device(s)) comprising a brain-computer interface (BCI) configured to monitor brain signals (e.g., gamma waves) and display visual, auditory, and/or tactile stimuli to the subject according to a neurofeedback threshold-based technique to promote brain signal coherence between the left and right hemispheres of a subject's brain. In some embodiments of the present technology, the EEG sensor device includes F3 and F4 electrodes on the left and right regions of the frontal lobe, respectively, and the BCI is configured to deliver F3-F4 gamma coherence neurofeedback. In some implementations, for example, the system can be configured to improve working memory for patients with schizophrenia, mild cognitive impairment, and/or suffering a mild traumatic brain injury or in early stages of Alzheimer's disease. In some implementations, the system can be used in combination with cognitive enhancing medications or cognitive remediation interventions (e.g., training gamma coherence to ready the brain prior to cognitive training exercises) with possible synergistic effects on cognition. In addition to improvements in memory, the system is envisioned to produce improvements in other aspects of cognition and psychiatric symptoms (e.g., speed of processing, reasoning and problem solving, positive and negative symptoms in schizophrenia).

In some aspects, a method for providing neurofeedback, which can be implemented to promote brain coherence, includes: presenting, at a display device, stimuli to a subject to invoke generation of neurological signal stimulation in a brain of a subject; measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe; and analyzing, at a data processing device in real time during the neurofeedback session, the brain signal data to determine a coherence value for a neurofeedback period of the plurality of neurofeedback periods based on a dynamic threshold, wherein the dynamic threshold is determined based at least in part on the coherence value from a prior neurofeedback period.

In some aspects, a system for providing neurofeedback, which can be implemented to promote brain coherence, includes: a display device to present stimuli to a subject to invoke generation of neurological signal stimulation in a brain of a subject; a brain signal detection device, wearable by a subject and comprising two or more electrodes, to measure a plurality of sets of brain signal data that include at least two individual brain signals from the subject's brain acquired from the two or more electrodes during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe where a first electrode is positioned and a second location on the subject's right-side frontal lobe where a second electrode is positioned; and a data processing device, comprising a processor and a memory in communication with the processor, to analyze the brain signal data in real time during the neurofeedback session to determine a coherence value for a neurofeedback period of the plurality of neurofeedback periods based on a dynamic threshold, wherein the dynamic threshold is determined based at least in part on the coherence value from a prior neurofeedback period.

These and other embodiments of the disclosed technology are described below, including example implementations and example data from such implementations in certain example embodiments, including for subjects with psychiatric conditions. For example, patients with schizophrenia (SCZ) exhibit working memory (WM) deficits that are associated with deficient dorsal-lateral prefrontal cortical activity, including decreased frontal gamma power. Training SCZ patients to increase frontal gamma activity is believed to improve their WM performance. In exemplary implementations of the disclosed technology, an example embodiment of an electroencephalographic (EEG) neurofeedback (NFB) training method was administered to 31 participants with SCZ for 12 weeks (e.g., 24 sessions), which provided real-time visual and auditory feedback related to frontal gamma activity. The EEG-NFB training significantly improved EEG markers of optimal working memory, e.g., frontal P3 amplitude and gamma power. An example embodiment of the BCI including an EEGLAB/MATLAB-based brain-computer interface (BCI) was used to deliver F3-F4 gamma coherence NFB with a dynamic threshold to the SCZ patients randomized in a double-blind, placebo-controlled clinical trial. The example BCI was shown to significantly increase F3-F4 gamma coherence after 12 weeks (24 sessions) of training, according to data from the first 12 subjects (n=6/group) who completed gamma- or placebo-NFB training. Further details of the example embodiments and implementations thereof are discussed below in this patent document.

DETAILED DESCRIPTION

Figure 1A:
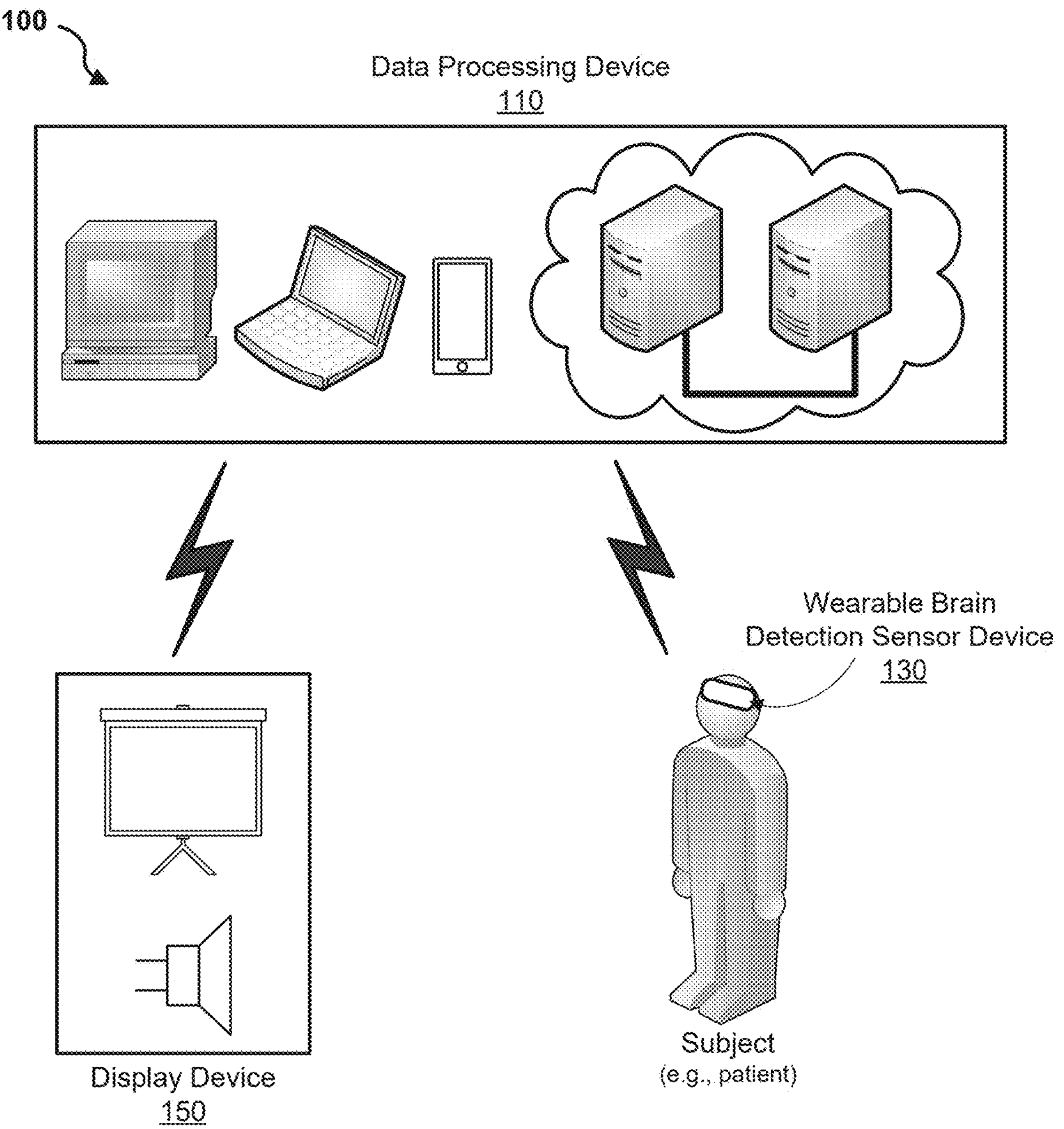
FIG. 1A shows a diagram of an example embodiment of a brain-computer interface system for providing dynamic threshold-based neurofeedback to promote brain coherence, in accordance with the present technology.

Disclosed are devices, systems, and methods for acquiring, analyzing, and utilizing neurofeedback to promote brain coherence, which can improve memory and other forms of cognition and psychiatric symptoms. Neurofeedback is a form of biofeedback that allows an individual to regulate his/her brain activity using visual, auditory, and/or tactile stimuli to measure and analyze brain function, thereby making it accessible for manipulation to improve brain function and mental health. Brain coherence is when the neurophysiological signals (e.g., electrical activity) of regions of the brain are coordinated or synchronized. As described herein, brain coherence is the bilateral coordination of brain signals with respect to the left hemisphere and right hemisphere of the brain, particularly at the left frontal lobe and right frontal lobe, which can be characterized by the frequency power of the measured brain signals at higher frequencies, e.g., 25 Hz and above in some embodiments, and 30 Hz and above in some embodiments.

In some embodiments in accordance with the disclosed technology, a system includes a brain signal detection device wearable by a subject to acquire brain signals, a display device to present stimuli (e.g., visual, auditory, and/or tactile stimuli), and a data processing device (e.g., a computer) comprising a brain-computer interface (BCI) configured to analyze the acquired brain signals and display the stimuli to the subject according to a neurofeedback threshold-based technique to promote brain signal coherence between the left and right hemispheres of a subject's brain.

The neurofeedback threshold-based technique can include presenting, at a display device, stimuli to a subject to invoke generation of neurological signal stimulation in a brain of a subject; measuring a plurality of sets of brain signal data from the subject's brain acquired during a neurofeedback session having a plurality of neurofeedback periods without presenting the stimuli and acquiring the brain signals during one or more break periods arranged between adjacent neurofeedback periods; and analyzing, in real time during the neurofeedback session, the brain signal data to determine a coherence value for a neurofeedback period of the plurality of neurofeedback periods based on a dynamic threshold, wherein the dynamic threshold is determined based at least in part on the coherence value from a prior neurofeedback period. The neurofeedback technique can further include regulating the presentation of the stimuli during the plurality of neurofeedback periods based on the coherence value, e.g., where, when the subject's real-time determined coherence value does not satisfy the dynamic threshold, the stimuli is adjusted (e.g., discontinued and/or relegated or reduced); and/or where, when the subject's real-time determined coherence value satisfies the dynamic threshold, the stimuli is adjusted (e.g., continued and/or enhanced or increased).

In some embodiments, for example, the brain signals include gamma signals. In some embodiments, for example, the brain signal detection device can include an EEG sensor device having a first EEG electrode positioned at a first location on the subject's left-side frontal lobe (e.g., F3) and a second EEG electrode positioned at a second location on the subject's right-side frontal lobe (e.g., F4). In some embodiments, for example, the brain signal acquirable by the brain signal detection device can be of a frequency between 0.1 Hz and 120 Hz; and in some example embodiments, the frequency of the bran signals can be between 1 Hz and 60 Hz. For example, in some embodiments, the BCI can be configured to deliver F3-F4 gamma coherence neurofeedback for the subject.

While some of the disclosed embodiments are described herein for promoting brain coherence in subjects with schizophrenia to facilitate understanding of the underlying concepts of the disclosed technology, it is understood that the embodiments and implementations of the present technology can also include subjects with other conditions, disorders or diseases or healthy subjects without a known condition, disorder, or disease for providing neurofeedback to promote brain coherence and improve memory and cognition.

Patients with schizophrenia (SCZ) suffer from diverse perceptual and cognitive deficits including impaired working memory (WM) performance. WM deficits in patients with SCZ is associated with abnormal neural markers of optimal WM function, e.g., task-related frontal P3 amplitude, as well as abnormal electroencephalographic (EEG) markers of synchronous dorsal-lateral prefrontal (DLPFC) activity, e.g., frontal gamma power. It was hypothesized that training patients with SCZ to increase EEG markers of optimal WM/DLPFC function, e.g., F3-F4 gamma coherence, would improve WM performance. To do so, an EEG neurofeedback (EEG-NFB), well-tolerated, non-invasive, non-pharmacologic treatment modality was created, as disclosed herein, which can be rapidly disseminated at low cost. For example, by coupling EEG markers of specific neural events to visual and auditory feedback signals, EEG-NFB through operant conditioning can enable patients to, in real-time, practice modulating specific forms of brain activity.

Previously, in an open-label study, it was hypothesized that 12 weeks (24 sessions) of an EEG neurofeedback regime could increase F3-F4 gamma coherence and would improve neural markers of optimal WM performance (e.g., frontal task-related P3 amplitude and gamma power). Clinical and neuropsychological outcomes from this study were previously reported F. Singh, I. W. Shu, S. H. Hsu, P. Link, J. A. Pineda, and E. Granholm, "Modulation of frontal gamma oscillations improves working memory in schizophrenia," *NeuroImage: Clinical*, vol. 27, January 2020, ISSN: 22131582, ultimately finding that change in gamma waves is related to a mechanism underlying behavioral change. In brief, estimates of EEG-NFB performance were positively-correlated with early frontal gamma power and WM performance; and NFB training could be associated with improved clinical and neuropsychological outcomes, as measured by the Positive and Negative Syndrome Scale (PANSS) and the Measurement and Treatment Research to Improve Cognition in Schizophrenia (MATRICS) Consensus Cognitive Battery (MCCB). Here, in this patent document, we present a new configuration of a brain-computer interface capable to provide new analyses of EEG features, e.g., including but not limited to frontal P3 amplitude and gamma power, and new techniques to cause training-related changes in working memory performance.

In some embodiments in accordance with the present technology, a real time dynamic thresholding-based NFB system and method provides neurofeedback in a subject to promote brain coherence of the subject. The disclosed dynamic thresholding-based NFB system and method is configured to (1) train coherent brain activity so that positive reinforcement is given when two brain regions are activated in concert with each other (2) using a dynamic threshold for training that is implemented in real time. Currently available protocols train to increase power of brain activity rather than coherence and use a static threshold which promotes learning at a slower rate, which is in contrast to a dynamic threshold that changes to accommodate the individual's changing brain activity. This type of dynamic threshold training can lead to great success at achieving the desired coherence which leads to greater positive reinforcement and enhanced learning in an "errorless learning" approach. In some applications of the present dynamic thresholding-based NFB technology, gamma coherence is trained; whereas, currently available protocols typically train theta or alpha activity rather than gamma. Furthermore, the disclosed dynamic thresholding-based NFB system and method can provide (3) an optimal work-to-rest ratio, where this feature encourages learning, while also being mindful of required periods of brain rest to promote neural consolidation of learning.

In some example applications of the disclosed dynamic thresholding-based NFB system and method, for example, subjects with schizophrenia (SCZ) or mild cognitive impairment (MCI) would be able to train their brain to improve gamma wave coherence in the front brain regions. As an example, a SCZ or MCI subject could undergo a training protocol, such as one or more (e.g., two) sessions per week, where the SCZ or MCI subject interacts with the brain-computer interface, implemented on a computer device, that presents visual, auditory, and/or tactile stimuli that train's coherent brain activity (e.g., harmony in brain signaling between the left and right hemispheres at the front lobe) via positive reinforcement in the stimuli presentation when the two brain regions are activated in concert with each other during the training regime, e.g., where each training can include two 15-minute periods of brain activity training with 5 minutes of rest in between the two periods. In some example applications, the example training protocol can be used to improve short-term memory in other disorders, such as mild traumatic brain injury (TBI), or early stages of Alzheimer's disease.

For instance, the disclosed dynamic thresholding-based NFB system and method can be implemented to stimulate gamma waves, train the subject's brain to promote coherence (e.g., signal frequency power) between the left and right hemispheres of these gamma waves, and optimally balance between brain work and brain rest. As such, the disclosed dynamic thresholding-based NFB system and method have cross-diagnostic applicability (e.g., schizophrenia, MCI, TBI) and may be used in healthy individuals to optimize short-term memory.

The disclosed dynamic thresholding-based NFB system and method were created and validated in example implementations of some example embodiments of the system and method. For example, in some example embodiments and implementations to demonstrate the capability of the disclosed technology, design and validation of an example dynamic thresholding-based NFB system and method included using an EEGLAB/MATLAB-based brain-computer interface (BCI), which tested gamma-versus placebo-NFBs. This example system and method was validated in example implementations including a double-blind, randomized, placebo-controlled clinical trial (RCT) of gamma-NFB to improve WM in patients with schizophrenia. Further details of the example validation implementation are described in this patent document, including information on real-time signal acquisition from wireless EEG headsets for custom signal processing, including updates of target EEG feature (e.g., dynamic threshold), and output to visual and auditory feedback signals. Also described herein include example results from the first 12 participants (n=6 per group) completing gamma- or placebo-NFB training, which support the system's ability to effectively increase F3-F4 gamma coherence over 12 weeks (24 sessions) of training.

Example Dynamic Thresholding NFB System

FIG. 1A shows a diagram of an example embodiment of a brain-computer interface system for providing dynamic threshold-based neurofeedback to promote brain coherence, in accordance with the present technology, and referred to as NFB system 100. In some embodiments, the NFB system 100 includes a display device 150 configured to present stimuli to a subject, e.g., a patient, that will invoke generation of neurological signal stimulation in the subject's brain. The NFB system 100 includes a brain signal detection device 130 to measure a plurality of sets of brain signal data, which the brain signal detection device 130 is wearable by the subject such that two or more electrodes of the brain signal detection device 130 acquire two or more individual brain signals from the subject's brain recorded via the two or more electrodes during a neurofeedback session. The neurofeedback session can include a plurality of neurofeedback periods in which the brain signal data is measured and one or more break periods in which the brain signal data is not acquired, where the one or more break periods can be arranged between adjacent neurofeedback periods. The NFB system 100 includes a data processing device 110, which includes at least one processor and at least one memory, that is configured to analyze the brain signal data in real time during the neurofeedback session to determine a coherence value (e.g., quantitative score) for a neurofeedback period of the plurality of neurofeedback periods based on a dynamic threshold, wherein the dynamic threshold is determined based at least in part on the coherence value from a prior neurofeedback period. The NFB system 100 provides a brain-computer interface (BCI) configured to promote brain signal coherence, which is a bilateral coordination of frequency power in the at least two individual brain signals with respect to a left hemisphere and a right hemisphere of the subject's brain. For example, the BCI can provide neurofeedback in a manner that optimizes the balance between brain work and rest for the subject, as too much work is taxing and frustrating to the brain, and too much rest does not lead to change and new connections in the brain.

In some embodiments of the brain signal detection device 130, at least two electrodes used to acquire at least two individual brain signals are positioned at two locations on the subject's brain, which include a first location on the subject's left-side frontal lobe where a first electrode is positioned and a second location on the subject's right-side frontal lobe where a second electrode is positioned. The brain signal detection device 130 can include a wireless transmitting device coupled to the two or more electrodes to wirelessly transmit the recorded signals. For example, in some embodiments, the brain signal detection device 130 can include a data processing unit to process the signals (e.g., amplify, digitize, etc.) the recorded brain signals. In some embodiments, the brain signal detection device 130 can include an electroencephalogram (EEG) sensor device that includes a first EEG electrode positioned at the first location on the subject's left-side frontal lobe and a second EEG electrode positioned at the second location on the subject's right-side frontal lobe. For example, in some implementations of the NFB system 100, the first EEG electrode of an exemplary EEG sensor device is positioned at F3 and the second EEG electrode of the exemplary EEG sensor device is positioned at F4. In some example embodiments of the NFB system 100, the EEG sensor device can include a multielectrode EEG cap, including a 24-channel or 32-channel wireless dry electrode EEG cap.

In some implementations of the NFB system 100, for example, the stimuli that the display device 150 can produce can includes a visual stimuli, auditory stimuli, and/or tactile stimuli. In some embodiments of the NFB system 100, for example, the display device 150 includes a display screen, e.g., such as a computer screen, a smartphone or tablet screen, a television, etc.; a speaker, e.g., such as a stereo speaker, a headphones, etc.; and/or a haptic feedback device, e.g., such as a force-feedback apparatus including but not limited to a haptic glove, a haptic pad, a haptic wrap, etc.

In some implementations of the NFB system 100, for example, the data processing device 110 is configured to determine the dynamic threshold by adjusting a previous threshold value based on a ratio of coordination between frequency power in the at least two individual brain signals sampled in a corresponding previous neurofeedback period. In some implementations of the NFB system 100, for example, the data processing device 110 is configured to determine the dynamic threshold by calculating an amount of overlap of the at least two individual brain signals in the neurofeedback period with respect to time and producing a threshold value corresponding to a percentile of the amount of overlap. For example, the data processing device 110 can be configured to calculate the amount of overlap involving determining a percentage of times the at least two individual brain signals peak together and the at least two individual brain signals trough together at each sampling time over the neurofeedback period and comparing the determined percentage to the percentile. In some examples, the percentile is in a range of 10% to 40%, or 15% to 30%, or 18% to 25%, or 20%±1%. In some implementations of the NFB system 100, for example, the data processing device 110 can be configured to determine an optimal work-to-rest ratio based at least in part on the dynamic threshold and/or the coherence value. In some implementations of the NFB system 100, for example, the data processing device 110 can be configured to analyze frequency power of the at least two individual brain signals acquired in a frequency range between 0.1 Hz and 120 Hz. In some implementations, for example, the frequency range is between 5 Hz and 50 Hz. In some implementations of the NFB system 100, for example, the data processing device 110 can be configured to signal-process the acquired data from the brain signal detection device 130, e.g., including but not limited to filtering, digitizing, parsing, etc. the data (e.g., EEG cleaning), which can be implemented in real-time with the measuring of the brain signals by the brain signal detection device 130 and the analysis and data processing of the brain signal data by the data processing device 110.

In some embodiments of the NFB system 100, for example, the data processing device 110 can include a desktop computer, a laptop computer, a smartphone, a tablet, a wearable smart device including a smartwatch or smartglasses, and/or one or more computing devices in communication with each other in a network (e.g., computer(s) in the cloud). In some embodiments of the NFB system 100, for example, the data processing device 110 and the display device 150 are configured in the same apparatus, like in the example of FIG. 1B.

Figure 1B:
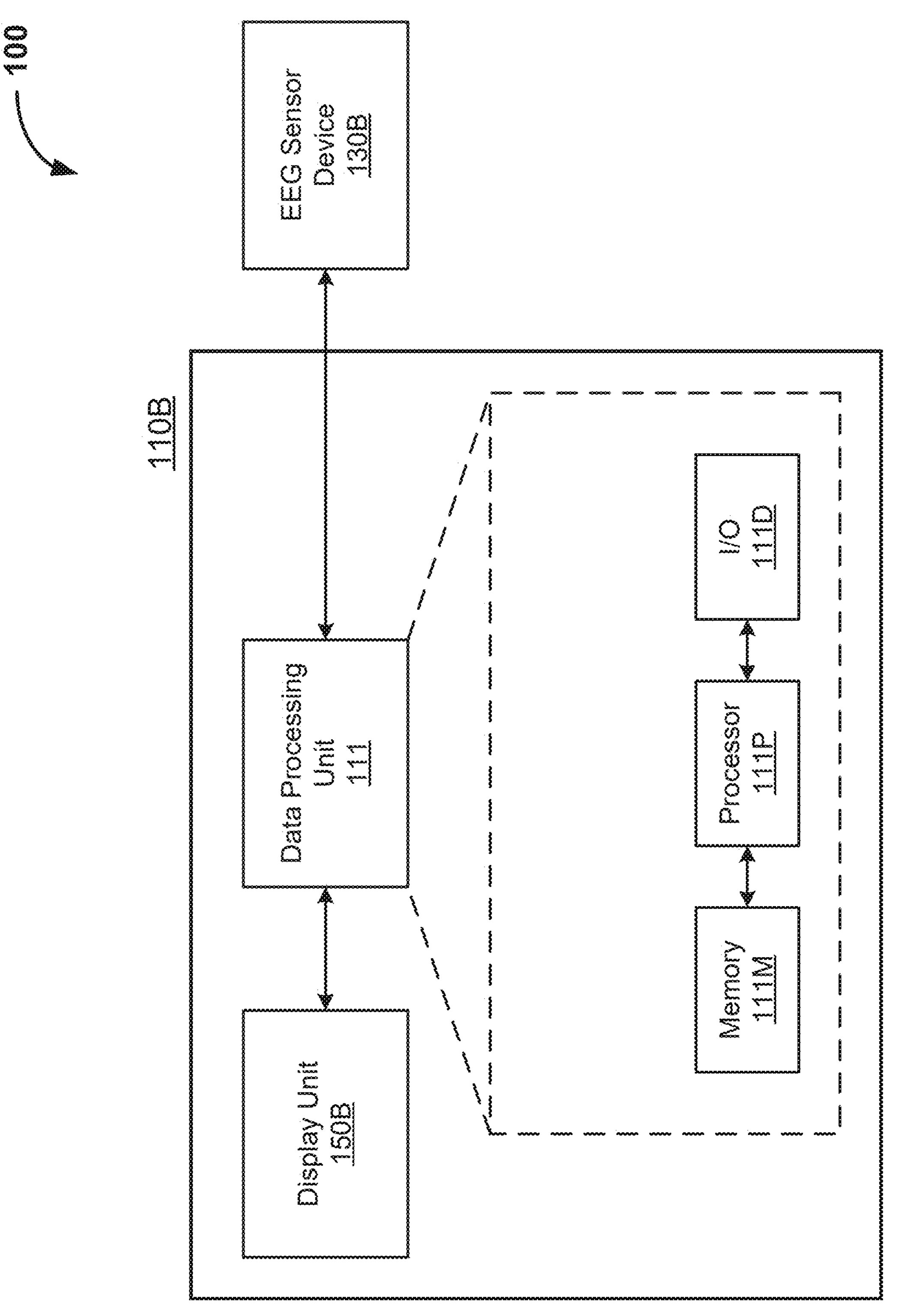
FIG. 1B shows a block diagram depicting an example embodiment of the NFB system of FIG. 1A, in accordance with the disclosed technology.

FIG. 1B shows a block diagram depicting an example embodiment of the NFB system 100 of FIG. 1A in accordance with the disclosed technology, labeled in FIG. 1B as NFB system 100B. The NFB system 100B includes a computer device 110B in communication (e.g., wired or wireless communication) with a wearable EEG sensor unit 130. In various implementations, the computer device 110B includes a data processing unit 111 and a display unit 150B. As such, the computer device 110B can embody the data processing device 110 and the display device 150 in accordance with the present technology. The data processing unit 111 can include various hardware and/or software modules or units of the disclosed system for processing data extracted from the subject, e.g., via the EEG sensor unit 120, based on neurofeedback-designed stimulus/stimuli of the subject outputted by the display unit 150B.

In some embodiments, for example, the display unit 150B can include a visual, auditory, and/or tactile display device, which can include various types of screen-based displays, audio speakers, and/or printing interfaces, e.g., which can be used to implement a NFB-inducing stimulus technique. For example, the display unit 150B can include cathode ray tube (CRT), light emitting diode (LED), or liquid crystal display (LCD) monitor or screen, among other visual displays, as a visual display. In some examples, the display unit 150B can include various types of audio signal transducer apparatuses or other sensory inducing apparatuses to implement the sensory stimuli. In other examples, the display unit 150B can include a printing apparatus, such as a toner, liquid inkjet, solid ink, dye sublimation, inkless (e.g., such as thermal or UV) printing device to implement an output of the data processing unit 111. The display unit 150B can exhibit data and information, such as the system data in a completely processed or partially processed form. The display unit 150B can be used to input and/or store data and information used to implement the disclosed techniques.

The block diagram of FIG. 1B also illustrates an example embodiment of the data processing unit 111, which can include a processor 111P that can be in communication with a memory 111M and an input/output (I/O) unit 111D. The data processing unit 111 can be implemented as one of various data processing systems, such as a personal computer (PC), laptop, and mobile communication device, such as a smartphone, tablet, or wearable computing device such as a smartwatch or smartglasses. In some implementations, the data processing unit 111 can be included in the device structure that includes the wearable EEG sensor unit 120. To support various functions of the data processing unit 111, the processor 111P can be included to interface with and control operations of other components of the data processing unit 111, such as the I/O unit 111D and/or the memory 111M. The memory 111M can store information and data, e.g., such as instructions, software, values, images, and other data processed or referenced by the processor 111P. Various types of Random Access Memory (RAM) devices, Read Only Memory (ROM) devices, Flash Memory devices, and other suitable storage media can be used to implement storage functions of the memory 111M. The memory 111M can store data and information, which can include subject stimulus and response data, and information about other units of the system, e.g., including the EEG sensor unit 120 and the display unit 150B, such as device system parameters and hardware constraints. The memory 111M can store data and information that can be used to implement the BCI NFB system 100 and various methods executed by the system 100. The I/O unit 111D can be connected to an external interface, source of data storage, or display device. Various types of wired or wireless interfaces compatible with typical data communication standards can be used in communications of the data processing unit 111 with the EEG sensor unit 120 and the visual display unit 150B and/or other units of the system, e.g., including, but not limited to, Universal Serial Bus (USB), IEEE 1394 (FireWire), Bluetooth, Bluetooth Low Energy (BLE), ZigBee, IEEE 802.111, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G/6G cellular communication methods, and parallel interfaces, can be used to implement the I/O unit 111D. The I/O unit 111D can interface with an external interface, source of data storage, or display device to retrieve and transfer data and information that can be processed by the processor 111P, stored in the memory 111M, or exhibited on display unit 150B. In some embodiments of the data processing unit 111, for example, the processor 111P can include a central processing unit (CPU) and/or a graphic processing unit (GPU), or both the CPU and the GPU.

Example Dynamic Thresholding NFB Methods

Figure 2A:
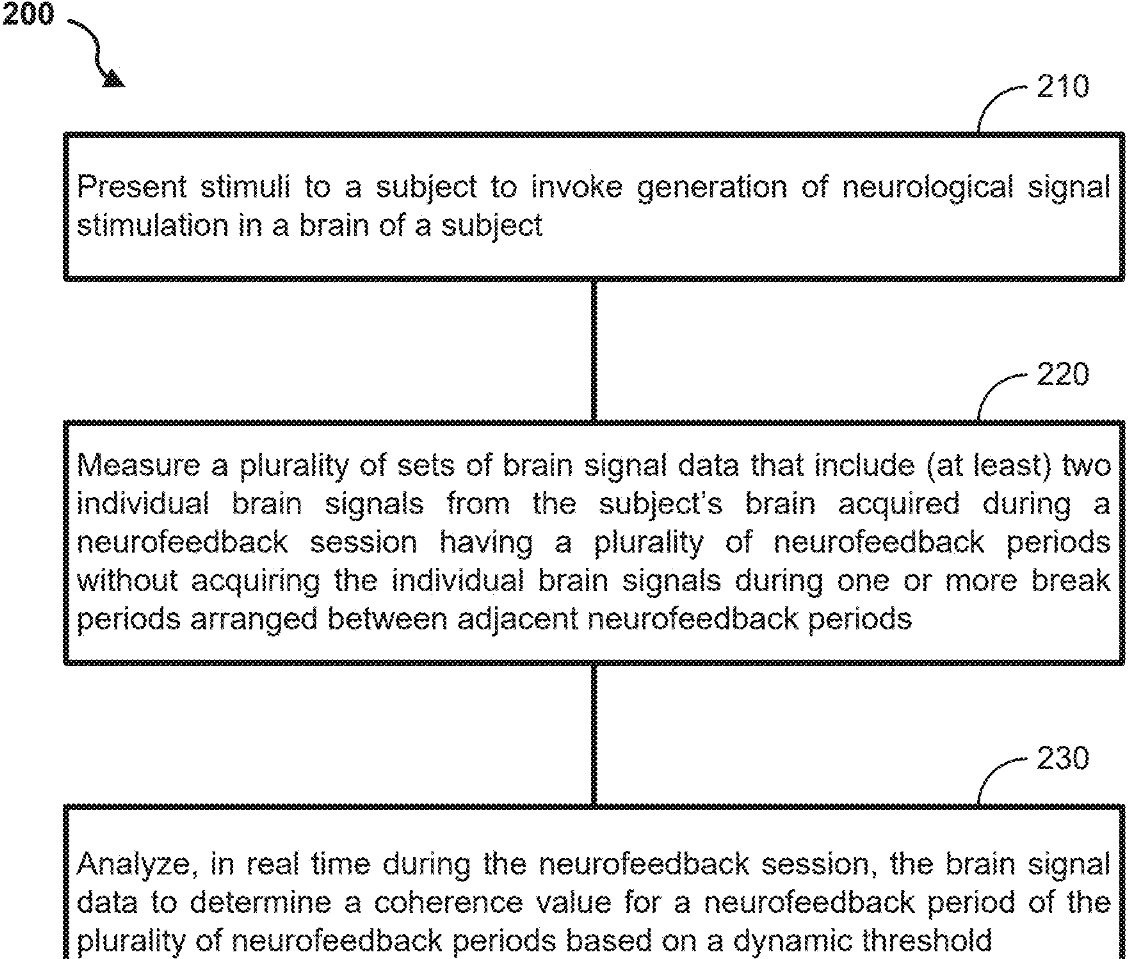
FIG. 2A shows a diagram depicting a method for providing neurofeedback to promote brain coherence in accordance with the present technology.

FIG. 2A shows a diagram depicting a method 200 for providing neurofeedback to promote brain coherence in accordance with the present technology. The method 200 includes a process 210 to present, e.g., at the display device 150, stimuli to a subject to invoke generation of neurological signal stimulation in a brain of a subject. The method 200 includes a process 220 to measure, e.g., at the brain signal detection device 130, a plurality of sets of brain signal data that include (at least) two individual brain signals from the subject's brain acquired during a neurofeedback session having a plurality of neurofeedback periods without acquiring the individual brain signals during one or more break periods arranged between adjacent neurofeedback periods. In some implementations of the process 220, for example, each of the at least two individual brain signals correspond to at least two locations on the subject's brain including a first location on the subject's left-side frontal lobe and a second location on the subject's right-side frontal lobe. The method 200 includes a process 230 to analyze, e.g., at the data processing device 110, in real time during the neurofeedback session, the brain signal data to determine a coherence value for a neurofeedback period of the plurality of neurofeedback periods based on a dynamic threshold. In some implementations of the process 230, for example, the dynamic threshold is determined based at least in part on the coherence value from a prior neurofeedback period. Implementation of the method 200 can provide a brain-computer interface (BCI) to promote brain signal coherence comprising a bilateral coordination of frequency power in the at least two individual brain signals with respect to a left hemisphere and a right hemisphere of the subject's brain. For example, in some implementations of the method 200, the process 230 can include analyzing the brain signal data by processing the frequency power of the individual brain signals acquired in a frequency range between 0.1 Hz and 120 Hz, including but not limited to 5 Hz to 50 Hz.

In some implementations of the process 230, for example, the dynamic threshold is determined by adjusting a previous threshold value based on a ratio of coordination between frequency power in the at least two individual brain signals sampled in a corresponding previous neurofeedback period. In some implementations of the process 230, for example, the dynamic threshold is determined by calculating an amount of overlap of the at least two individual brain signals in the neurofeedback period with respect to time and producing a threshold value corresponding to a percentile of the amount of overlap (e.g., percentile in a range of 10% to 40%, or 15% to 30%, or 18% to 25%, or 20%±1%). For example, the amount of overlap can be calculated by determining a percentage of times the at least two individual brain signals peak together and the at least two individual brain signals trough together at each sampling time over the neurofeedback period and comparing the determined percentage to the percentile.

In some embodiments of the method 200, for example, the method 200 can further include a process to determine an optimal work-to-rest ratio based at least in part on the dynamic threshold. In some examples, a work-to-rest ratio optimization can include extending a duration of a break period of the one or more break periods arranged between adjacent neurofeedback periods based on a decrease in a value or series of values of the dynamic threshold; and additionally or alternatively, in some examples, a work-to-rest ratio optimization can include reducing a duration of a break period of the one or more break periods arranged between adjacent neurofeedback periods based on an increase in a value or series of values of the dynamic threshold.

Figure 2B:
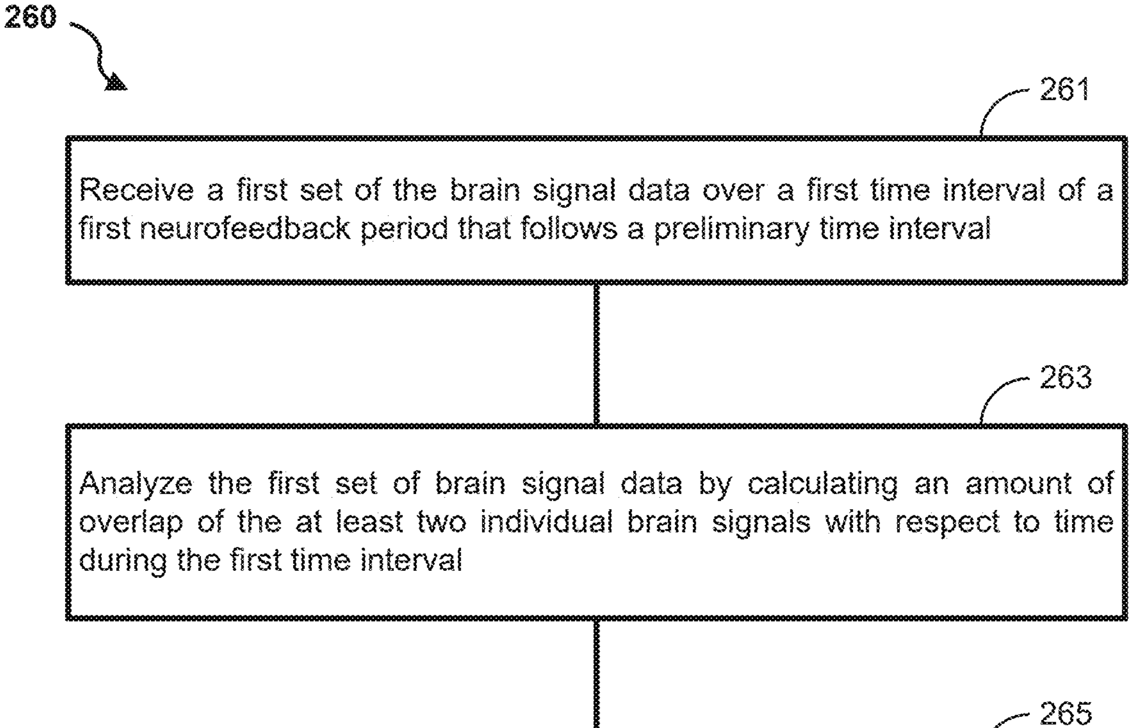
FIG. 2B shows a diagram depicting a method for analyzing and utilizing neurofeedback from brain signal data of a subject in real time to promote brain coherence, in accordance with example embodiments of the method of FIG. 2A, in accordance with the disclosed technology.

FIG. 2B shows a diagram depicting a method 260 for analyzing and utilizing neurofeedback from brain signal data of a subject in real time to promote brain coherence, in accordance with example embodiments of the method 200. The method 260 includes a process 261 to receive a first set of the brain signal data over a first time interval of a first neurofeedback period that follows a preliminary time interval. The method 260 includes a process 263 to analyze the first set of brain signal data by calculating an amount of overlap of the at least two individual brain signals with respect to time during the first time interval. The method 260 includes a process 265 to produce a first dynamic threshold to be a value corresponding to a percentile of the amount of overlap when a baseline threshold was satisfied by the first set of brain signal data of the first time interval, or maintain the baseline threshold for a subsequent time interval when the baseline threshold was not satisfied by the first set of brain signal data.

In some embodiments of the method 200, for example, the method 200 can further include a process to receive, prior to the receiving a first set of the brain signal data over a first time interval, the preliminary set of brain signal data acquired over a preliminary time interval; and analyze the preliminary set of brain signal data to determine a baseline threshold by calculating an amount of overlap of the at least two individual brain signals with respect to time during the preliminary time interval and producing the baseline threshold to be a value corresponding to a percentile of the amount of overlap.

In some embodiments of the method 200, for example, the method 200 can further include a process to receive a second set of the brain signal data over a second time interval of the first neurofeedback period that follows the first time interval; analyze the second set of brain signal data by calculating an amount of overlap of the at least two individual brain signals with respect to time during the second time interval; and produce a second dynamic threshold to be a value corresponding to a percentile of the amount of overlap when the first dynamic threshold was satisfied by the second set of brain signal data of the second time interval, or maintain the first threshold for a subsequent time interval when the first threshold was not satisfied by the second set of brain signal data.

In some embodiments of the method 200, for example, the method 200 can further include a process or processes to repeat the processes 261, 263, 265, in general, for a next set of brain signal data over a next time interval of the first neurofeedback period that follows a previous time interval; and to implement a first break; and to repeat the processes 261, 263, 265 for a plurality of time intervals of a second neurofeedback period; and concluding the neurofeedback session.

For example, in some implementations of the method 200, a time period of the first time interval and/or the second time interval and/or any time interval of an NFB period can be in a range of 1 to 5 minutes; and/or a sampling time of the first time interval and/or the second time interval and/or any time interval of an NFB period can include a range of 0.1 sampling time to 10 seconds sampling time or 0.5 seconds to 5 seconds for sampling time. For example, in some implementations of the method 200, a time period of the first time interval and/or the second time interval can include 3 minutes, and/or a sampling time of the first time interval and/or the second time interval can be 0.5 seconds; and/or a time period of the preliminary time interval can include 1 minute, and/or a sampling time of the preliminary time interval can be 0.5 seconds.

Example Implementations of the NFB Systems and Methods

Example implementations of the disclosed dynamic thresholding-based NFB system and method are described for an EEG-based neurofeedback system targeting frontal gamma activity of schizophrenia patients to improve working memory, referred to as "EEG-NFB platform." Patients with schizophrenia (SCZ) exhibit working memory (WM) deficits that are associated with deficient dorsal-lateral prefrontal cortical activity, including decreased frontal gamma power. Training SCZ patients to increase frontal gamma activity is believed to improve their WM performance. In exemplary implementations of the disclosed technology, electroencephalographic (EEG) neurofeedback (NFB) was administered to 31 participants with SCZ for 12 weeks (24 sessions), which provides real-time visual and auditory feedback related to frontal gamma activity. The EEG-NFB training significantly improved EEG markers of optimal working memory, e.g., frontal P3 amplitude and gamma power. Based on these example results, an example embodiment of the BCI including an EEGLAB/MATLAB-based brain-computer interface (BCI) was used to deliver F3-F4 gamma coherence NFB with a dynamic threshold to SCZ patients randomized in a double-blind, placebo-controlled clinical trial. The example BCI was shown to significantly increase F3-F4 gamma coherence after 12 weeks (24 sessions) of training, according to data from the first 12 subjects (n=6/group) who completed gamma- or placebo-NFB training.

A. Example Procedures in Example Study

1) Participants: In the open-label trial, 31 participants (female=16), with mean+/−SD age (years)=45.4+/−9.55 and a diagnosis of SCZ or schizoaffective disorder were enrolled. For the RCT, data from the first 12 participants to complete all gamma-NFB (n=6) or placebo-NFB (n=6) sessions were included for analysis;

mean+/−SD age (years) for gamma-NFB=41.6+/−13.9 (female=1) and for placebo-NFB=51.2+/−8.38 (female=2). Enrollment criteria for the RCT were equivalent to criteria for the open-label study. All study procedures were approved by the University of California San Diego Human Research Protections Program.

2) NFB Training: For the open-label study, participants received 30 min gamma-NFB training twice a week for 12 weeks. Further details are discussed below for the example EEG-NFB platform developed to administer gamma-versus placebo-NFB for RCT participants.

3) Working Memory Tasks: For the open-label study, to determine WM performance, participants were assessed at baseline and every four weeks of treatment (t=0, 4, 8 and 12 weeks) with letter N-back tests (N=0, 1 and 2). For the N-back task, the participants were instructed to compare every letter to N letters back while wearing a 32-channel wireless dry electrode EEG cap, Cognionics Quick30, for EEG data collection at 500 Hz sampling rate. The N-back tasks were conducted in the order of difficulties with 0-back recorded first as a baseline, followed by 1-back and 2-back tasks. Presentation software was used for stimuli display and test delivery B. Example Embodiment of the EEG-NFB System The example embodiment of the EEG-NFB system included an EEGLAB and MATLAB-based BCI to process and record real time EEG signal from an example 10-channel dry EEG headset, e.g., Cognionics Quick-10r. Labstreaminglayer and LabRecorder are utilized to ensure the NFB system has real-time feedback and that time labels are precise. Psychtoolbox is used for generating the NFB interface. Participants were instructed to, after a one minute resting session, focus on slideshows of their choice, containing visual content and music pre-arranged by study staff. Total time of each NFB session is 31 min with the first block containing one min baseline for the F3-F4 coherence initial threshold calculation and 15 min dynamic threshold NFB, and the second block of 15 min dynamic threshold NFB. Raw online EEG data is resampled to 500 Hz and normalized by subtracting the mean value every second. F3-F4 gamma coherence is calculated using the mscohere( ) function from the Signal Processing Toolbox with a sliding window of three seconds at every second.

For dynamic threshold NFB, an initial threshold is calculated based on the 20th percentile gamma coherence value using the first minute of NFB EEG data so that the in-session coherence value should exceed threshold for 80% of the time. After this initial minute, threshold updates every three minutes as follows. If the in-session coherence in fact exceeds the threshold at least 80% of the time, threshold will be updated to the 20th percentile value for the most recent three minute period, effectively increasing target coherence levels; otherwise, the threshold will remain the same value. If in-session coherence is lower than the threshold more than 20% of the time for two consecutive three-minute periods, the threshold will be lowered to the 20th percentile value for the most recent three-minute period. When establishing baseline during the first minute, visual feedback plays continuously without interruption. Once baseline threshold has been established, during active NFB, visual feedback plays continuously without interruption if real-time gamma coherence value exceeds threshold; otherwise, the visual feedback pauses. The example EEG-NFB study also included a placebo group where participants receive pre-determined feedback signal from a randomly pre-assigned participant in the active group. Both participants and staff with participant contact are blinded to randomization status.

Figure 3A:
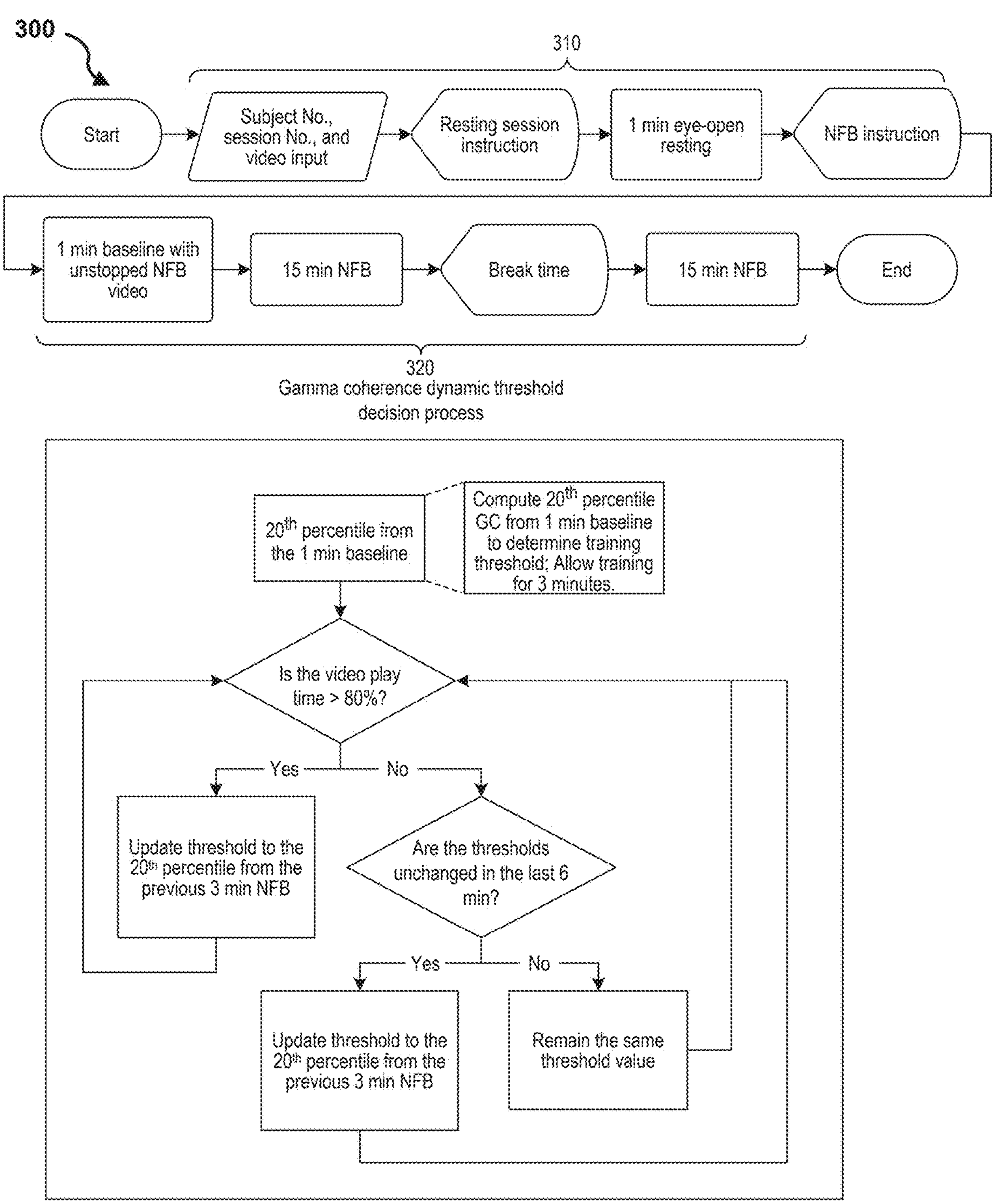
FIG. 3A shows a diagram depicting an example embodiment of a dynamic threshold NFB method, in accordance with the present technology and utilized in example implementations for a double-blind, randomized, placebo-controlled clinical trial to improve working memory in patients with schizophrenia.

FIG. 3A shows a diagram depicting an example embodiment of a dynamic threshold NFB method 300, in accordance with the method 200 and/or the method 260 present technology, utilized in the example implementations of the EEG-NFB platform for the double-blind, randomized, placebo-controlled clinical trial to improve working memory in patients with schizophrenia. The method 300 includes an optional preparation process 310 to introduce the instructions and provide preliminary rest to the subject prior to the NFB session. The method 300 includes a process 320 to provide a gamma coherence dynamic threshold decision process, which includes a baseline acquisition session (e.g., 1-min baseline with unstopped stimuli), a first NFB period of the NFB session (e.g., 15-min NFB session, broken into five 3-min time intervals), a break (e.g., 5 min), and a second NFB period of NFB session (e.g., 15-min NFB session, broken into five 3-min time intervals).

The process 320 includes a series of decisions for the dynamically thresholding of the neurofeedback. For example, the EEG NFB platform was configured to control the presentation of the stimuli to the subjects, on the display device, for each time interval of a respective NFB period based on the determined coherence value. In the example implementations, the coherence value was determined based on a score of how frequent the subject's left-frontal lobe EEG-sampled gamma signals (e.g. F4) and right-frontal lobe EEG-sampled gamma signals (e.g. F5) had coordinated peaks and troughs in a time interval, by which that score was compared to the dynamic threshold value, e.g., which was reevaluated at each time interval of the NFB period. For instance, when the coherence value did not satisfy the dynamic threshold, the stimuli were adjusted by, at least temporarily, discontinuing the presentation; and wherein when the coherence value was determined to satisfy the dynamic threshold, the stimuli was adjusted by, at least temporarily, continuing the presentation. In other implementations not part of the study, the stimuli could be adjusted by altering the content of the presentation based on the coherence value satisfying or not satisfying the dynamic threshold.

Figure 3B:
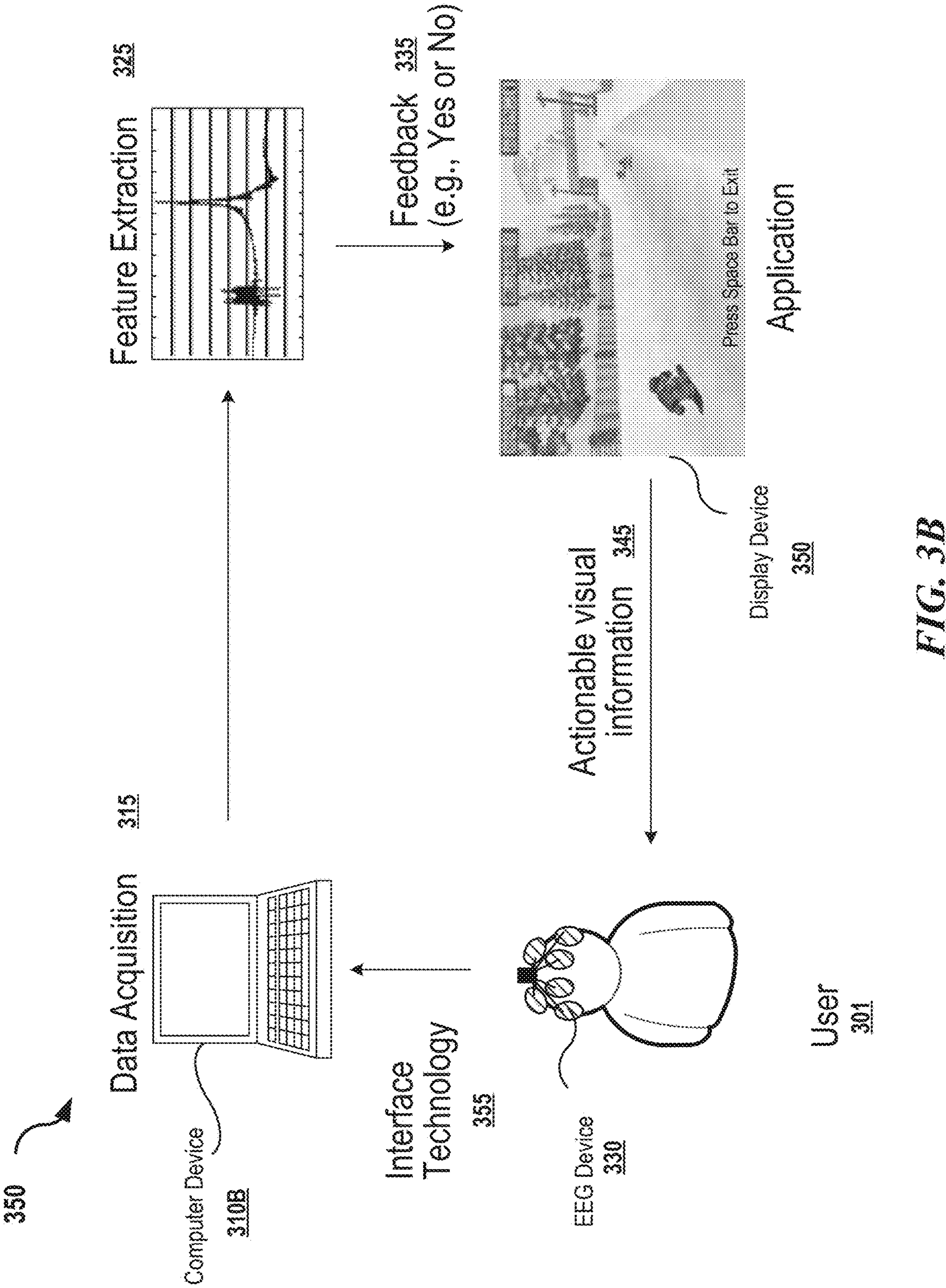
FIG. 3B shows a diagram depicting an example embodiment of a dynamic threshold NFB system, in accordance with the present technology and utilized in the example implementations for the clinical trial to improve working memory in patients with schizophrenia.

FIG. 3B shows a diagram depicting an example embodiment of a dynamic threshold NFB system 350, in accordance with the present technology and utilized in the example implementations for the clinical trial to improve working memory in patients with schizophrenia. The NFB system 350 included an EEG device 330 worn by a user 301 to extract EEG signals of the user 301's brain, e.g., including but not limited to an EEG electrode at the left-frontal lobe and an EEG electrode at the right-frontal lobe. In the example implementations, a 32-electrode, wireless, EEG cap was used as the EEG device 330. The NFB system 350 includes a computer device 310B that provided the data acquisition of the EEG signal data from the EEG device 330, e.g., via interface technology 355, including but not limited to wireless transceiver system between the computer device 310B and the EEG device 330. The NFB system 350 included a display device 350 that provided visual and auditory stimuli, e.g., in the form of video content controlled in software (an application), which the user 301 interfaced with the display device 350 for actionable visual information 345. The computer device 310B analyzed the acquired EEG data to determine signal features (feature extraction 325) and implement the NFB method 300 to create a feedback output 335 (e.g., yes or no) for continuing presentation of the application based on the coherence value satisfying the dynamic threshold during the NFB periods.

C. Example Data Analysis

EEGLAB under Matlab 2018b was used to process the raw EEG data. The EEG data were low-pass and high-pass filtered at 1.0 Hz and 50 Hz with FIR filters respectively. Bad EEG channels were then removed and interpolated automatically using EEGLAB plugins pop_rejchan( ) and clean_rawdata( ) with specific criteria, e.g., (1) spectral power between 1-50 Hz that was three standard deviations above or below that of other channels, (2) channels with flat signals longer than 5 seconds, (3) channels that were poorly correlated ($r<0.7$) with their reconstructed versions based on adjacent channels, and/or (4) channels with line noise power four standard deviations higher than their signals. Lastly, the EEG data were re-referenced to common average reference.

Figure 4A:
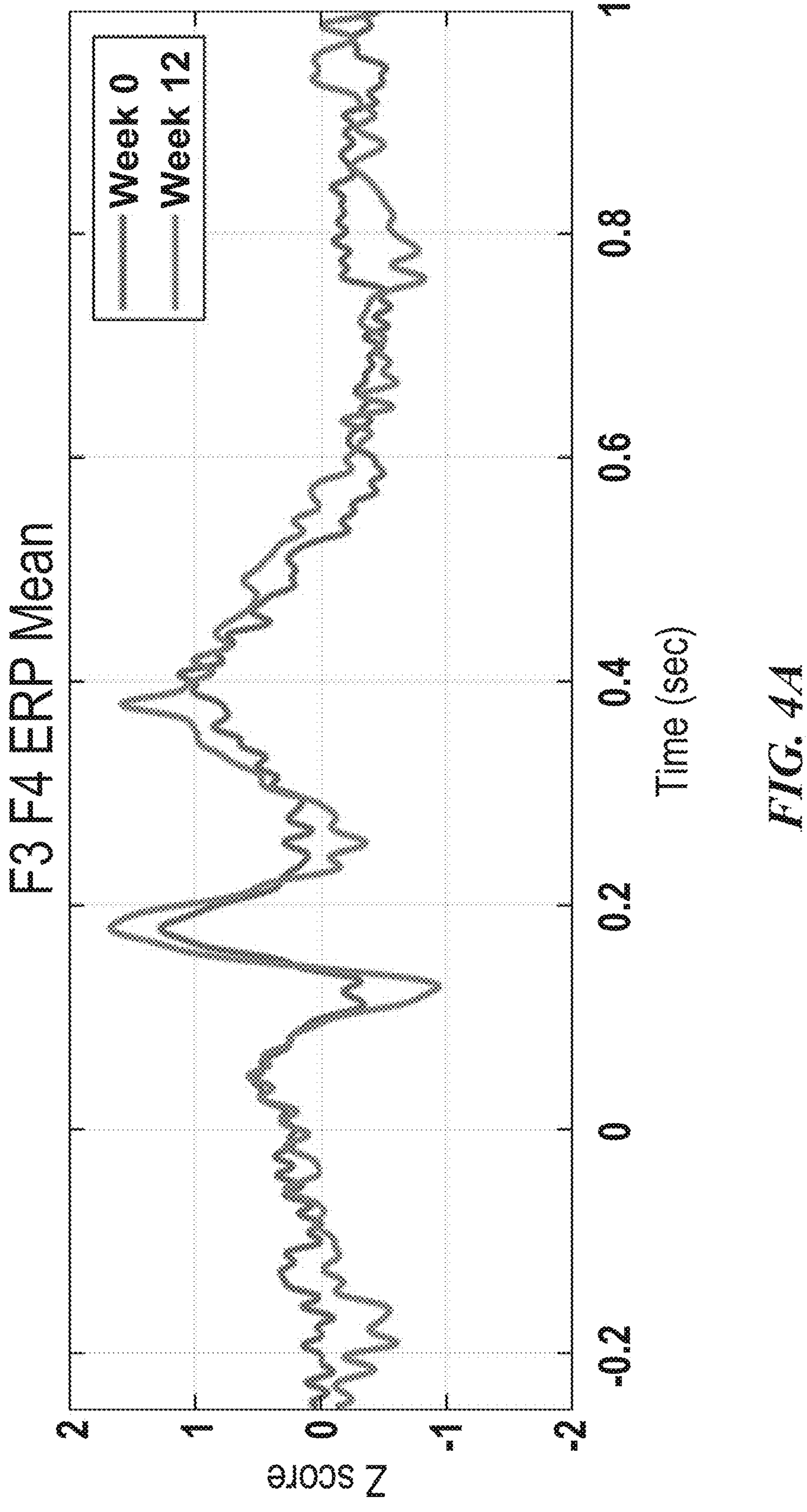
FIGS. 4A-4D show diagrams and data plots depicting example event-related potential data, event-related spectrograms, and statistical analysis from example implementations of the NFB method shown in FIG. 3A.

EEG data from 2-back trials were epoched from −0.25 to 1.75 seconds, time-locked to the onset of stimuli presentation. To exclude artifact contaminated data, epochs that have the maximum signal amplitude greater than 150 μV were rejected. Event-related potential (ERP) results of F3 and F4 were calculated by averaging through all 2-back trials from all subjects at each evaluation time point (t=0, 4, 8 and 12 weeks). The mean ERP of F3 and F4 at week 0 and week 12 are shown in FIG. 4A. The P3 amplitude was examined by taking the average of the positive value from 250 ms to 500 ms for every subject. The correlation of the P3 amplitude difference and 2-back accuracy difference between week 12 and week 0 were calculated and displayed in FIG. 4C.

Figure 4B:
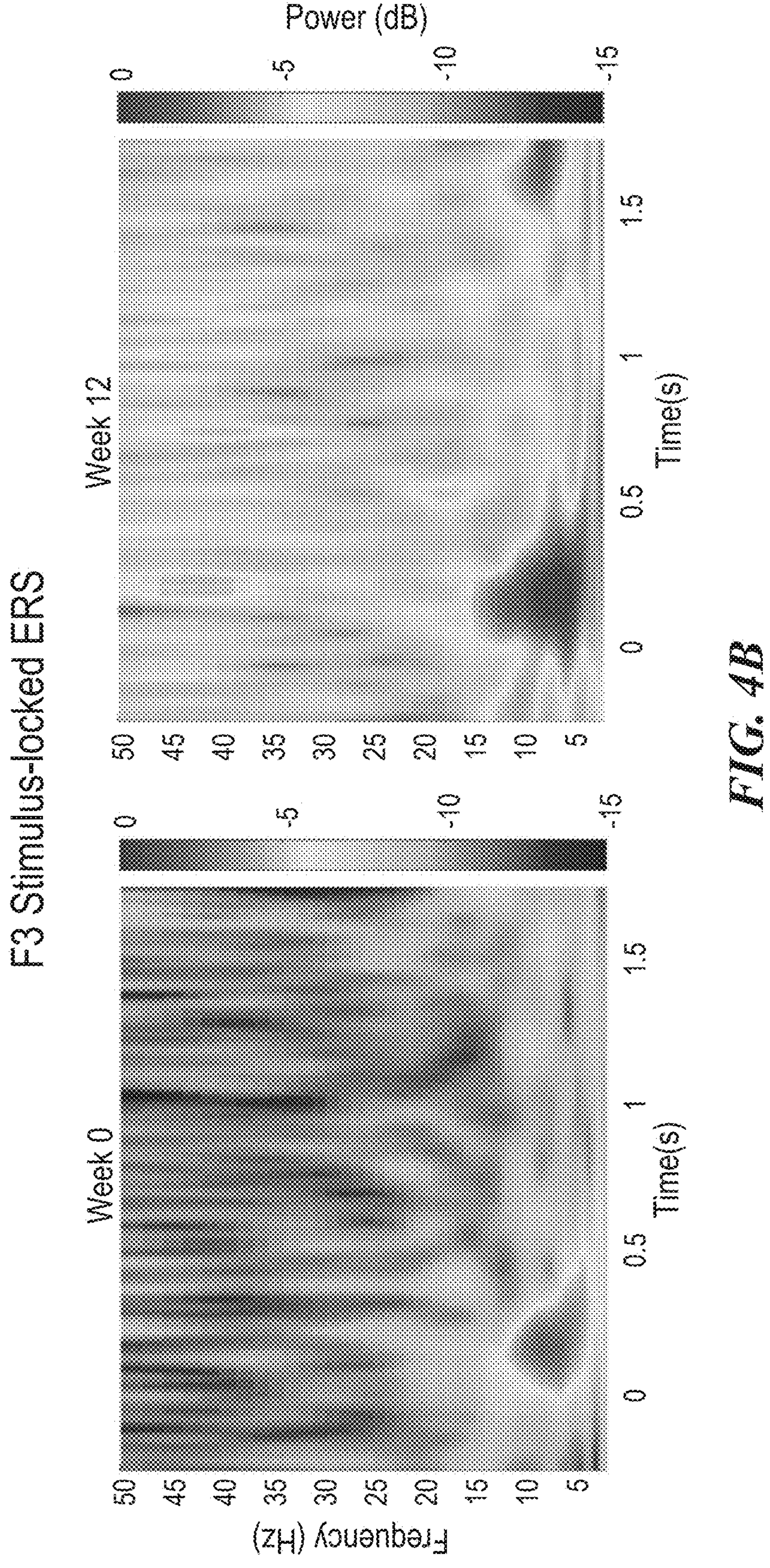

Event-related spectrogram (ERS) was computed using continuous wavelet transform by the cwt( ) MATLAB function with analytic Morlet, 16 voices per octave, and frequency limit from 2 to 50 Hz and then averaged across all trials (FIG. 4B). Intensity of five frequency bands (delta, theta, alpha, beta, and gamma) at the frontal locations F3, F4, and Fz were examined and the average power of gamma band (30-50 Hz) from the 0 to 1.5 s post stimulus time period was calculated. Gamma power differences between week 12 and week 0 were calculated and the relation changes in P3 amplitude are displayed in FIG. 4D.

D. Statistical Analysis

EEG features were analyzed using an intent-to-treat mixed model repeated-measures (MMRM) approach. The model included as dependent variables task-related F3-F4 P3 amplitude and gamma power at monthly assessments (for the open-label study); and, F3-F4 gamma coherence per week-of-training (for RCT). Independent variables included time (for open-label study); and group, session, and group× time interaction (for RCT). For both open-label study and RCT, significant results were followed up by paired t-tests, including effect size (Cohen's d) estimates. Additionally, for the open-label study, hypothesis-driven Spearman correlations were estimated to ascertain the relationship between Week 12 (end of treatment) minus Week 0 (baseline/pre-treatment) changes between P3 amplitude, WM performance and gamma power. For the open label study, multiple imputations by fully conditional specification (FCS) was used to replace the 58 (out of 290 possible) EEG observations missing due to technical difficulties. All statistical analysis was performed using IBM SPSS v28. EEG data was not replaced for one participant in the open-label study due to excessive line noise during baseline (Week 0) assessment followed by their withdrawing from study prior to Week 4 assessment.

Example Implementations: Example Results

A. ERP During N-back Tests

Participants exhibited robust WM-related ERPs at F3 and F4 during two-Back trials: N1, P2 and P3. Comparing baseline (Week 0, blue) and end-of-treatment (Week 12, red) waveforms indicate that gamma-NFB training increases task-related ERP amplitudes (FIG. 4A). Specific to our hypothesis that gamma-NFB increases WM-related P3 amplitudes, MMRM modeling demonstrated a significant effect of time for F3-F4 P3 amplitude ($\gamma=0.0452$, $t(29)=3.231$, $p=0.002$). Compared to Week 12/end-of-treatment, follow-up paired t-tests were significant for F3-F4 P3 amplitude at all assessments: Week 0/Baseline ($t(29)=3.136$, $p=0.002$, $d=0.573$.), Week 4 ($t(29)=2.891$, $p=0.004$, $d=0.528$), Week 8 ($t(29)=3.540$, $p=0.001$, $d=0.646$).

To better characterize the neurophysiologic mechanism connecting F3-F4 P3 amplitude and WM, their strength of correlation was then tested. If training-related neurophysiologic changes improved WM performance; then, participants with the greatest training-related increases in P3 amplitude would be expected to exhibit the greatest improvements in 2-Back accuracy. Consistent with this hypothesis, we observed significant correlations between change in F3-F4 P3 amplitude (Week 12 minus Week 0) and 2-Back performance (Week 12 minus Week 0), $\rho=0.395$, $p=0.015$ (FIG. 4C).

Figure 4C:
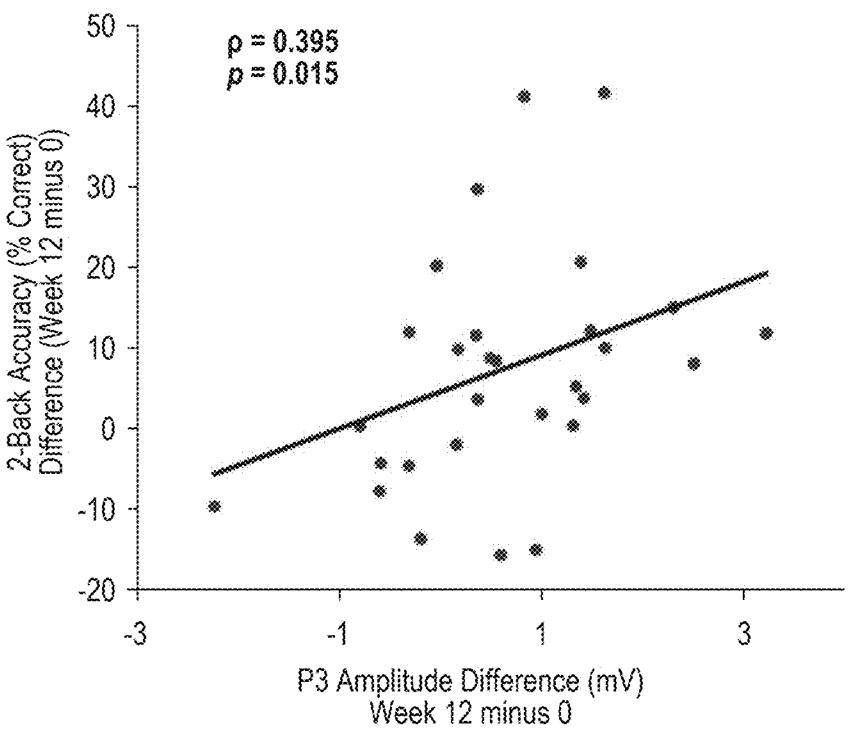
Figure 4D:
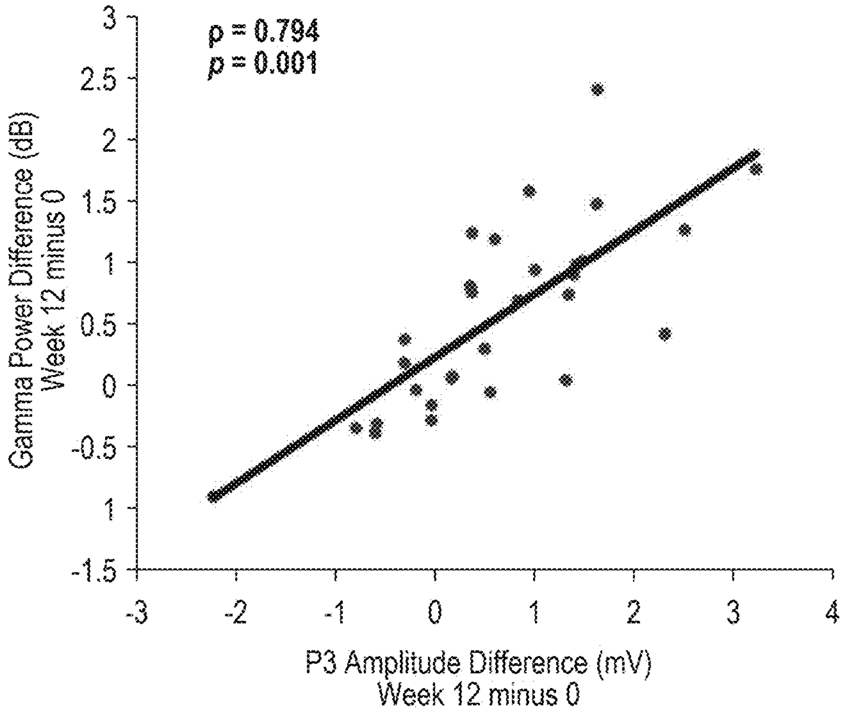

FIGS. 4A-4D show diagrams and data plots depicting example results of the ERP, ERS, and statistical analysis from the example implementations. FIG. 4A shows example F3 F4 mean ERP during 2-back task at Week 0 and Week 12. FIG. 4B shows example stimulus-locked ERS results at Week 0 and Week 12. FIG. 4C shows a data plot depicting significant correlations between change in F3-F4 P3 amplitude (Week 12 minus Week 0) and 2-Back performance (Week 12 minus Week 0), $\rho=0.395$, $p=0.015$. FIG. 4D shows a data plot depicting F3-F4 gamma power, $\rho=0.794$, $p<0.001$.

B. Frontal Gama Activity During N-back Tests

Consistent with previous reports, participants exhibited robust, early (0-500 ms latency), task-related theta and alpha synchronization, at baseline (FIG. 4B). Compared to theta and alpha synchronization, baseline task-related gamma synchronization was relatively weaker (FIG. 4B, left panel). During the course of training, however, task-related gamma synchronization progressively increased (FIG. 4B, right panel). Specific to our hypothesis that gamma-NFB increases WM-related frontal gamma power, MMRM modeling demonstrated a significant effect of time for F3-F4 gamma power ($\gamma=0.0468$, $t(29)=4.165$, $p<0.001$). Compared to Week 0/Baseline, follow-up paired t-tests were significant for F3-F4 gamma at all assessments: Week 4 ($t(29)=2.465$, $p=0.01$, $d=0.450$); Week 8 ($t(29)=2.290$, $p=0.015$, $d=0.418$); Week 12 ($t(29)=4.071$, $p<0.001$, $d=0.743$); follow-up t-tests were also significant between Week 4 and Week 12 ($t(29)=3.361$, $p=0.001$, $d=614$).

To better characterize the neurophysiologic mechanism connecting F3-F4 P3 amplitude and gamma power, we next tested their strength of correlation. If coupled training-related neurophysiologic changes produce both greater P3 amplitude and gamma power; then, participants with the greatest training-related increases in P3 amplitude would be expected to exhibit the greatest increases in gamma power. Consistent with this hypothesis, we observed significant correlations between change in F3-F4 P3 amplitude (Week 12 minus Week 0) and F3-F4 gamma power (Week 12 minus Week 0), ρ=0.794, p<0.001 (FIG. 4D).

C. Novel BCI Gamma-NFB Validation

After each NFB session is completed, the F3-F4 gamma coherence and target threshold values is stored and displayed as a plot.

Figure 5A:
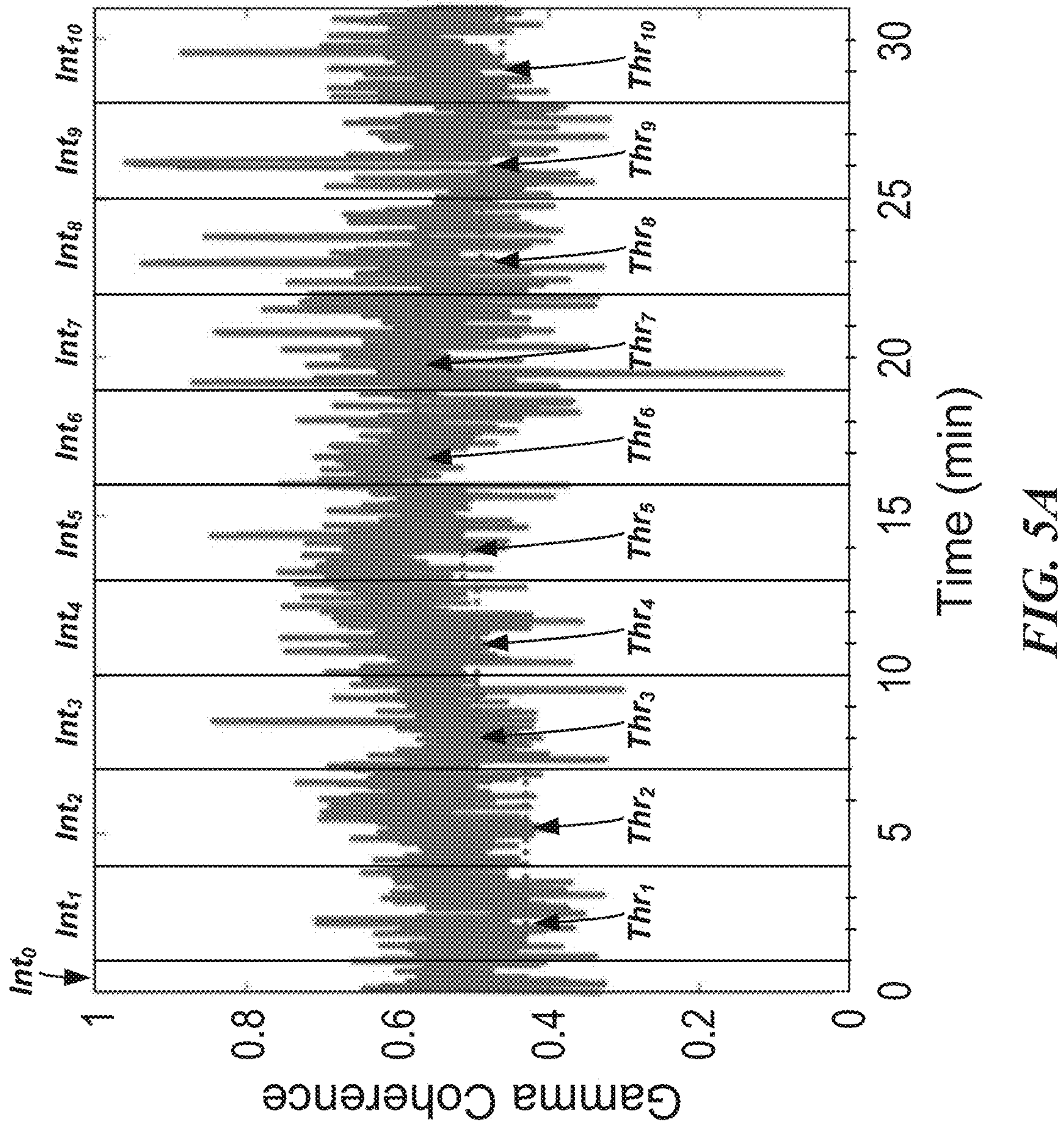
FIGS. 5A-5C show data plots depicting example gamma coherence and feedback signal data and analysis from example implementations of the NFB method shown in FIG. 3A.
Figure 5B:
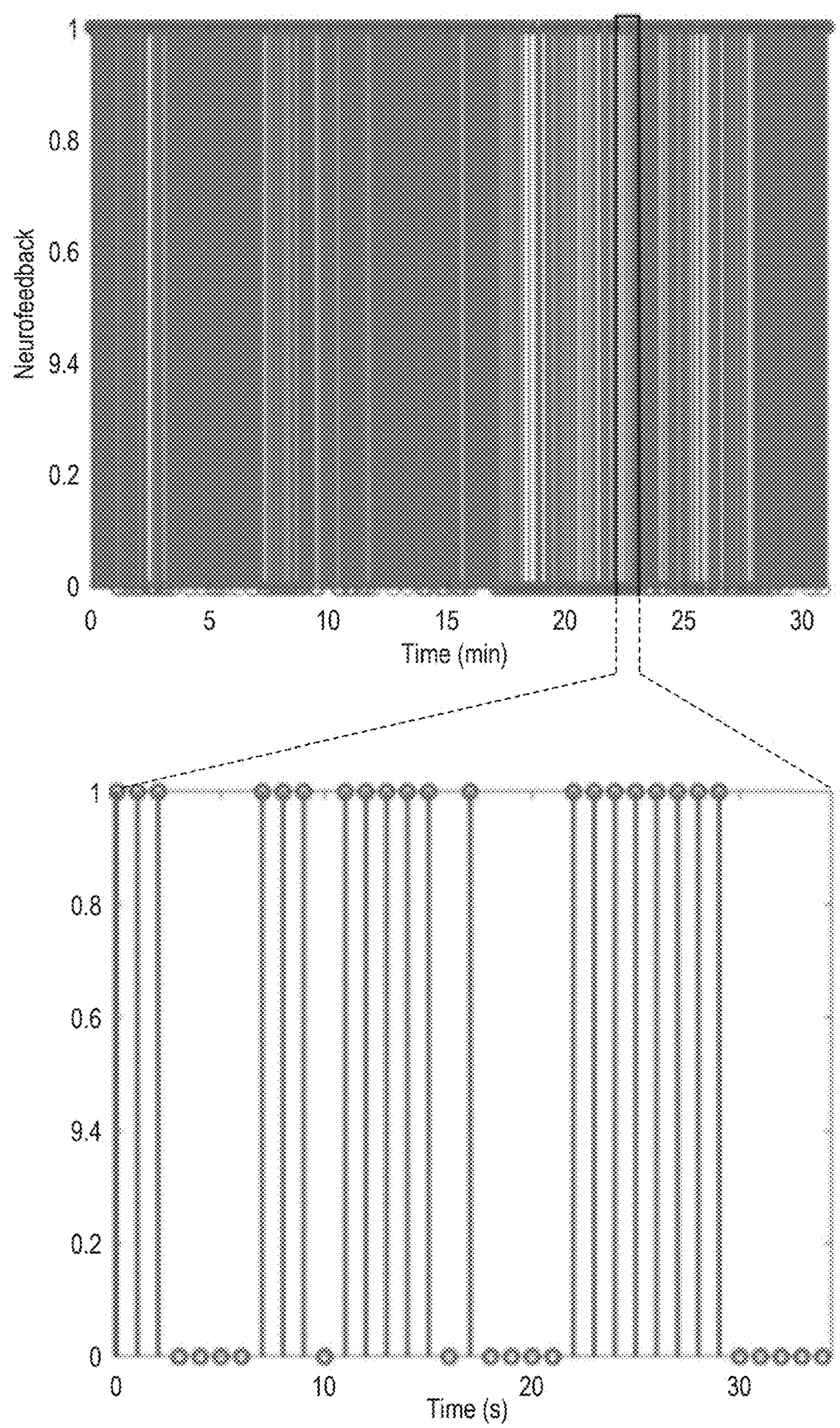
Figure 5C:
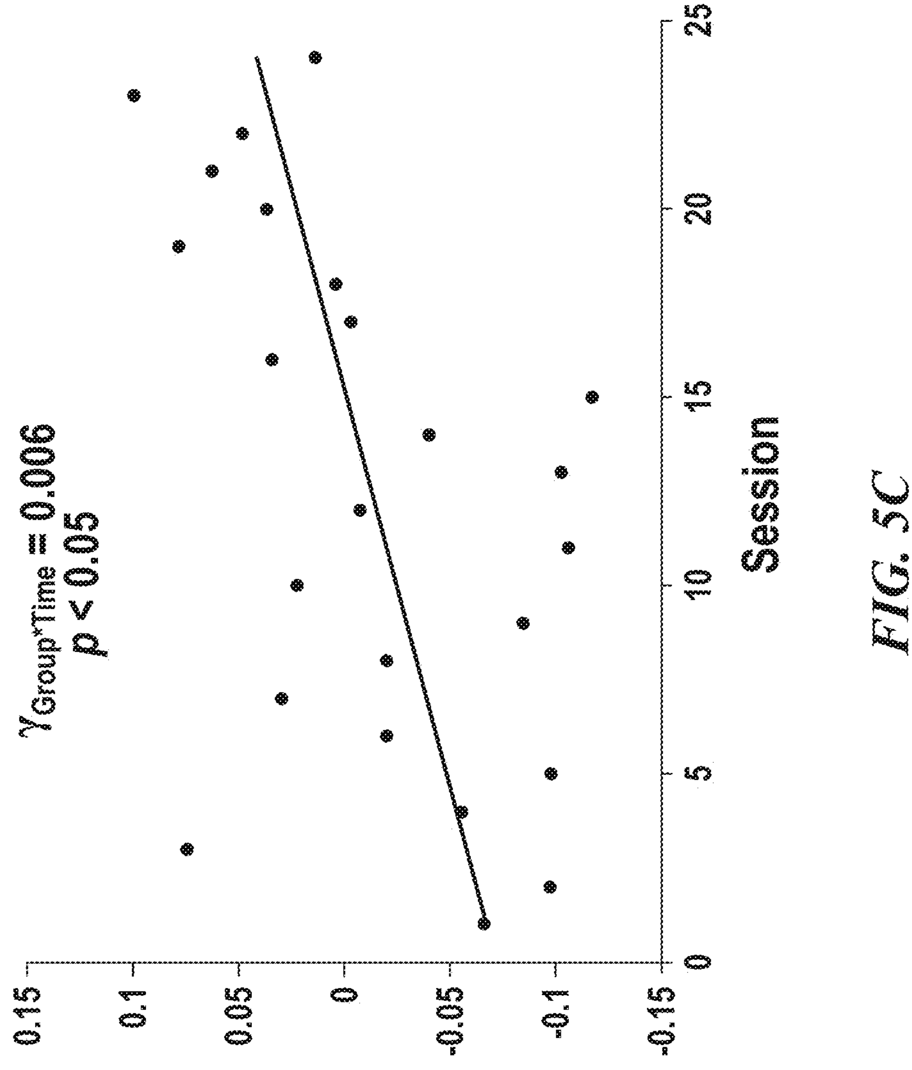

FIGS. 5A-5C show data plots depicting example gamma coherence and feedback signal data and analysis from the example implementations. FIG. 5A shows F3-F4 gamma coherence and target thresholds (dotted, horizontal lines, labeled $Thr_{[interval\ \#]}$) across a plurality of time intervals during an NFB period, i.e., one preliminary time interval ($Int_0$) and ten dynamically-threshold training intervals ($Int_1$-$Int_{10}$). FIG. 5B shows feedback signal (1: video play, 0: video pause) outputs after a NFB session. FIG. 5C shows F4-F4 gamma coherence differences at each session (active minus placebo) significantly increases with time ((γ=0.00562, t(11)=2.157, p=0.043).

Sample output of gamma coherence is shown in FIG. 5A, confirming that above dynamic threshold protocol produces expected modulation of F3-F4 gamma coherence. Positive and negative reinforcement signals (playing or pausing of video, respectively) are updated every second and also stored and displayed as a plot. More specifically, signal to play video (when gamma coherence exceeds threshold) is encoded as 1; conversely, signal to pause video (when gamma coherence is at or below threshold) is encoded as 0 (FIG. 5B).

Consistent with gamma-NFB producing persistent changes in F3-F4 gamma coherence, MMRM modeling demonstrated a significant effect of group×time interaction for F3-F4 gamma coherence (γ=0.00562, t(11)=2.157, p=0.043). More specifically, this significant group×time interaction predicts a trend towards greater endpoint-minus-baseline increase in F3-F4 gamma coherence for gamma-NFB compared to placebo-NFB (t(11)=1.551, p=0.076, d=0.896), FIG. 5C.

ERP is an extensively utilized technique to explore EEG data with distinct event-related labels. N-back tasks are also widely used to investigate WM performance. Compared to healthy controls, WM-related P3 amplitude is generally attenuated in participants with SCZ, independent of WM load. The example results (e.g., FIGS. 4A, 4C and 4D) demonstrate that gamma-NFB training significantly increases frontal P3 amplitude in participants with SCZ. Furthermore, training-related increases in P3 amplitude significantly correlate with training-related improvements in WM performance, consistent with a model where, for participants with SCZ, targeting WM-related neural activity can improve WM performance.

Schizophrenia patients often exhibit multiple cognitive impairments. Within the impairments, WM deficiency is associated with abnormal DLPFC neurotransmitter expression C. These abnormalities are associated with abnormal neural synchrony, including attenuated gamma activity for SCZ patients compared to healthy subjects. The direct relationship between WM performance and DLPFC gamma activity suggests that, in patients with schizophrenia, frontal gamma activity may serve as a specific marker of optimal DLPFC function during WM. Our results indicate that gamma-NFB training is a feasible method for improving frontal gamma activity in participants with SCZ (FIGS. 4B and 4D). Motivated by these promising results, we proceeded to develop a novel NFB system in order to test gamma-NFB to improve for participants with SCZ using a double-blind, placebo-controlled RCT design.

Our novel NFB system features real-time EEG signal feedback and acquisition with a wireless dry-electrode headset to improve the time efficiency and participant experience. Moreover, compared to some black-box operations from commercial products, this NFB system has a verifiable signal processing protocol using accessible MATLAB code to produce real-time feedback signals. The output from the NFB system after each treatment (FIGS. 5A and 5B) provides a feasible method for confirming that our NFB protocol enables participants to directly modulate their frontal gamma coherence in the target manner. Preliminary system validation data confirm that F4-F4 gamma coherence differences between active and placebo groups, at each session, increases with time (FIG. 5C)—indicating that, in contrast to placebo-NFB, active gamma-NFB produce more efficient learning by participants with regards to increasing frontal gamma coherence activity.

In the example studies, it was observed that, for participants with SCZ, gamma-NFB improves WM, most likely by increasing neural signatures of optimal WM performance (open-label trial), and that a novel EEGLAB/MATLAB-based NFB system significantly increases frontal gamma coherence in active participants (compared to participants receiving placebo-NFB) within a double-blind, placebo-controlled RCT of gamma-NFB to improve WM for participants with SCZ. While potentially confounding non-specific effects have not been fully excluded, these promising, early results support a specific neural mechanism underlying WM improvements in participants with SCZ receiving gamma-NFB. The exemplary BCI NFB system was currently deployed in an active RCT, where it was aimed to more formally test the specificity of the signal of interest on clinical, neuropsychologic and neurophysiologic outcomes.

Figure 6:
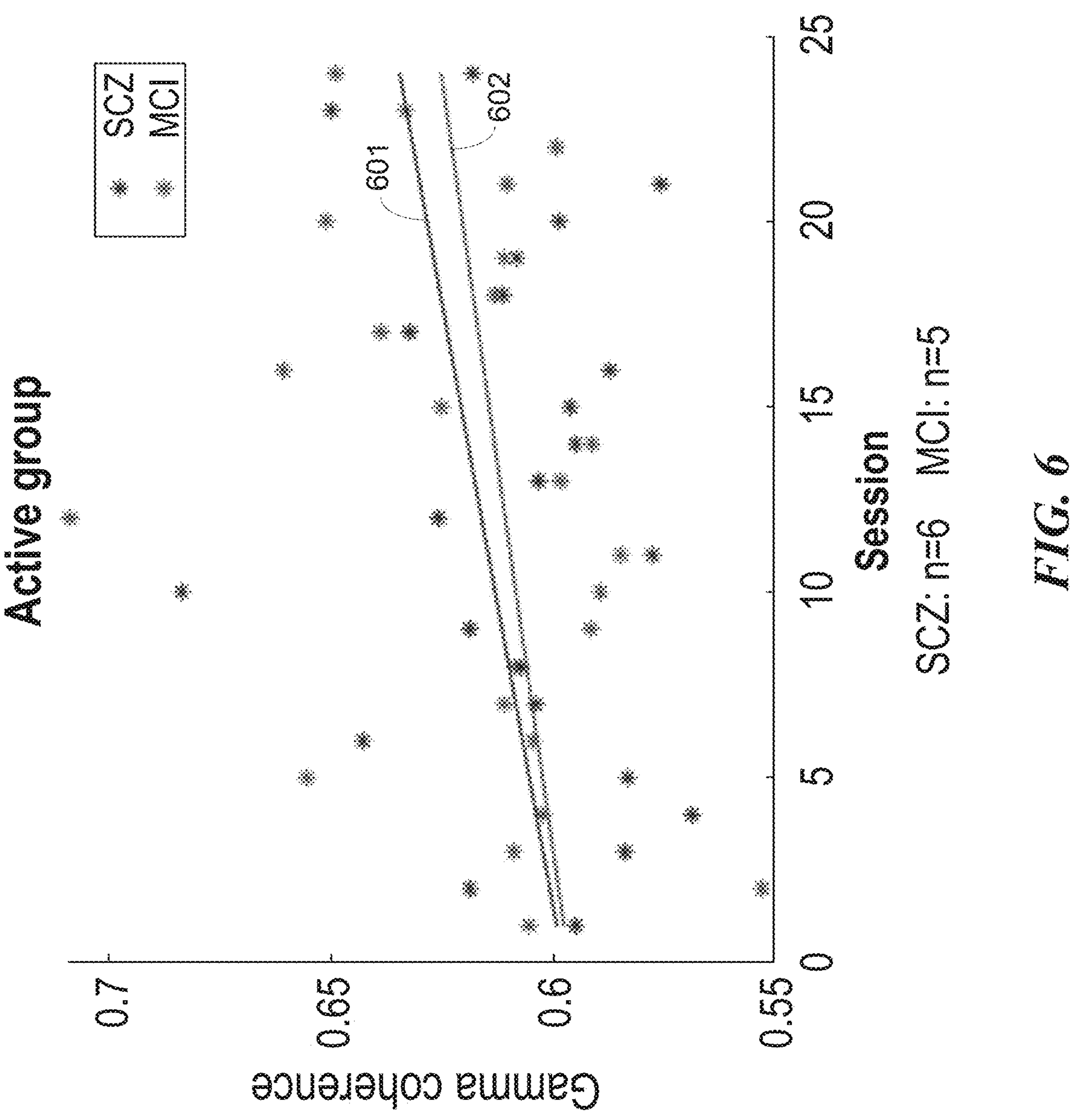
FIG. 6 shows a data plot depicting a time trajectory of frontal gamma coherence from example implementations of the NFB method shown in FIG. 3A.

FIG. 6 shows a data plot depicting a time trajectory of frontal gamma coherence over 12 weeks of training (i.e., 24 sessions) for SCZ subjects (n=5, data depicted in blue dots), and MCI subjects (n=5, data depicted in red dots). Average gamma coherence of SCZ subjects is shown by line 601, and average gamma coherence of MCI subjects is shown by line 602. The example data demonstrated substantially increased gamma coherence among the two subject groups, e.g., >2% increase for MCI subjects, and >3% increase for SCZ patients.

EXAMPLES

In some embodiments in accordance with the present technology (example A1), a method of performing neurofeedback includes providing stimuli to a subject to generate a sensory stimulation on the subject; collecting, from the subject, during a plurality of neurofeedback periods, neurofeedback signals including coherence values that are generated by a brain stimulation of the subject resulting from the sensory stimulation, without collecting the neurofeedback signals during one or more break period arranged between adjacent neurofeedback periods; and adjusting a threshold neurofeedback value based on a ratio between each neurofeedback period and a first time during which the coherence values exceed the threshold neurofeedback value.

Example A2 includes the method of example A1 or any of examples A1-A5, where the method further comprises:

determining an optimal work-to-rest ratio based on the adjusted threshold neurofeedback value.

Example A3 includes the method of example A1 or any of examples A1-A5, wherein the coherence values include F3-F4 gamma coherence neurofeedback (NFB) values.

Example A4 includes the method of example A1 or any of examples A1-A5, wherein the sensory stimulation includes at least one of auditory or visual stimulation.

Example A5 includes the method of example A1 or any of examples A1-A4, wherein the neurofeedback signals include electroencephalographic (EEG) neurofeedback (NFB) signals.

In some embodiments in accordance with the present technology (example B1), a method for providing neurofeedback, which can be implemented to promote brain coherence, includes: presenting, at a display device, stimuli to a subject to invoke generation of neurological signal stimulation in a brain of a subject; measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe; and analyzing, at a data processing device in real time during the neurofeedback session, the brain signal data to determine a coherence value for a neurofeedback period of the plurality of neurofeedback periods based on a dynamic threshold, wherein the dynamic threshold is determined based at least in part on the coherence value from a prior neurofeedback period.

Example B2 includes the method of example B1 or any of examples B1-B25, wherein the presenting, the measuring, and the analyzing provide a brain-computer interface (BCI) to promote brain signal coherence comprising a bilateral coordination of frequency power in the at least two individual brain signals with respect to a left hemisphere and a right hemisphere of the subject's brain.

Example B3 includes the method of example B1 or any of examples B1-B25, wherein the dynamic threshold is determined by adjusting a previous threshold value based on a ratio of coordination between frequency power in the at least two individual brain signals sampled in a corresponding previous neurofeedback period.

Example B4 includes the method of example B1 or any of examples B1-B25, wherein the dynamic threshold is determined by calculating an amount of overlap of the at least two individual brain signals in the neurofeedback period with respect to time and producing a threshold value corresponding to a percentile of the amount of overlap.

Example B5 includes the method of example B4 or any of examples B1-B25, wherein the calculating the amount of overlap includes determining a percentage of times the at least two individual brain signals peak together and the at least two individual brain signals trough together at each sampling time over the neurofeedback period and comparing the determined percentage to the percentile.

Example B6 includes the method of examples B4 or B5 or any of examples B1-B25, wherein the percentile is in a range of 10% to 40%.

Example B7 includes the method of example B1 or any of examples B1-B25, further comprising: determining an optimal work-to-rest ratio based at least in part on the dynamic threshold.

Example B8 includes the method of example B7 or any of examples B1-B25, further comprising: extending a duration of a break period of the one or more break periods arranged between adjacent neurofeedback periods based on a decrease in a value or series of values of the dynamic threshold.

Example B9 includes the method of example B7 or any of examples B1-B25, further comprising: reducing a duration of a break period of the one or more break periods arranged between adjacent neurofeedback periods based on an increase in a value or series of values of the dynamic threshold.

Example B10 includes the method of example B1 or any of examples B1-B25, wherein the at least two individual brain signals includes electroencephalogram (EEG) signals.

Example B11 includes the method of example B10 or any of examples B1-B25, wherein the first EEG electrode is positioned at F3 and the second EEG electrode is positioned at F4.

Example B12 includes the method of example B1 or any of examples B1-B25, wherein the analyzing the brain signal data includes examining frequency power of the at least two individual brain signals acquired in a frequency range between 0.1 Hz and 120 Hz.

Example B13 includes the method of example B12 or any of examples B1-B25, wherein the frequency range is between 5 Hz and 50 Hz.

Example B14 includes the method of example B1 or any of examples B1-B25, wherein the stimuli presented to the subject includes at least one of visual stimuli, auditory stimuli, or tactile stimuli.

Example B15 includes the method of example B1 or any of examples B1-B25, wherein the analyzing the brain signal data to determine the coherence value for a neurofeedback period based on the dynamic threshold comprises: receiving a preliminary set of brain signal data acquired over a preliminary time interval; and analyzing the preliminary set of brain signal data to determine a baseline threshold by calculating an amount of overlap of the at least two individual brain signals with respect to time during the preliminary time interval and producing the baseline threshold to be a value corresponding to a percentile of the amount of overlap.

Example B16 includes the method of example B15 or any of examples B1-B25, wherein the percentile is in a range of 15% to 30%.

Example B17 includes the method of examples B15 or B16 or any of examples B1-B25, wherein at least one of: a time period of the preliminary time interval includes a range of 30 seconds to 3 minutes, or a sampling time of the preliminary time interval includes a range of 0.1 second to 5 seconds.

Example B18 includes the method of example B15 or any of examples B1-B25, wherein the analyzing the brain signal data to determine the coherence value for a neurofeedback period based on the dynamic threshold comprises: receiving a first set of the brain signal data over a first time interval of a first neurofeedback period that follows the preliminary time interval; analyzing the first set of brain signal data by calculating an amount of overlap of the at least two individual brain signals with respect to time during the first time interval; and producing a first dynamic threshold to be a value corresponding to a percentile of the amount of overlap when the baseline threshold was satisfied by the first set of brain signal data of the first time interval, or maintaining the baseline threshold for a subsequent time interval when the baseline threshold was not satisfied by the first set of brain signal data.

Example B19 includes the method of example B18 or any of examples B1-B25, wherein the percentile is in a range of 15% to 30%.

Example B20 includes the method of examples B18 or B19 or any of examples B1-B25, wherein at least one of: a time period of the first time interval includes a range of 1 minute to 5 minutes, or a sampling time of the first time interval is 0.1 second to 5 seconds.

Example B21 includes the method of example B18 or any of examples B1-B25, wherein the analyzing the brain signal data to determine the coherence value for a neurofeedback period based on the dynamic threshold comprises: receiving a second set of the brain signal data over a second time interval of the first neurofeedback period that follows the first time interval; analyzing the second set of brain signal data by calculating an amount of overlap of the at least two individual brain signals with respect to time during the second time interval; and producing a second dynamic threshold to be a value corresponding to a percentile of the amount of overlap when the first dynamic threshold was satisfied by the second set of brain signal data of the second time interval, or maintaining the first threshold for a subsequent time interval when the first threshold was not satisfied by the second set of brain signal data.

Example B22 includes the method of example B21 or any of examples B1-B25, wherein the percentile is in a range of 15% to 30%.

Example B23 includes the method of example B22 or any of examples B1-B25, wherein at least one of: a time period of the second time interval includes a range of 1 minute to 5 minutes, or a sampling time of the second time interval is 0.1 second to 5 seconds.

Example B24 includes the method of example B18 or any of examples B1-B25, wherein the analyzing the brain signal data to determine the coherence value for a neurofeedback period based on the dynamic threshold comprises: repeating receiving, analyzing, and producing or maintaining steps of example B21 for a next set of brain signal data over a next time interval of the first neurofeedback period that follows a previous time interval; implementing a first break of the one or more break periods; repeating receiving, analyzing, and producing or maintaining steps of examples B18 and B21 or examples B18-B23 for a plurality of time intervals of a second neurofeedback period; and concluding the neurofeedback session.

Example B25 includes the method of example B24 or any of examples B1-B25, further comprising: controlling, at the data processing device, the presentation of the stimuli, by the display device, during the plurality of neurofeedback periods based on the coherence value, wherein, when the coherence value is determined to not satisfy the dynamic threshold, the stimuli is adjusted by at least temporarily discontinuing the presentation and/or altering content of the presentation, and/or wherein when the coherence value is determined to satisfy the dynamic threshold, the stimuli is adjusted by at least temporarily continuing the presentation and/or altering the content of the presentation.

In some embodiments in accordance with the present technology (example B26), a system for providing neurofeedback, which can be implemented to promote brain coherence, includes: a display device to present stimuli to a subject to invoke generation of neurological signal stimulation in a brain of a subject; a brain signal detection device, wearable by a subject and comprising two or more electrodes, to measure a plurality of sets of brain signal data that include at least two individual brain signals from the subject's brain acquired from the two or more electrodes during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe where a first electrode is positioned and a second location on the subject's right-side frontal lobe where a second electrode is positioned; and a data processing device, comprising a processor and a memory in communication with the processor, to analyze the brain signal data in real time during the neurofeedback session to determine a coherence value for a neurofeedback period of the plurality of neurofeedback periods based on a dynamic threshold, wherein the dynamic threshold is determined based at least in part on the coherence value from a prior neurofeedback period.

Example B27 includes the system of example B26 or any of examples B26-B40, wherein the display device, the brain signal detection device, and the data processing device of the system provide a brain-computer interface (BCI) configured to promote brain signal coherence comprising a bilateral coordination of frequency power in the at least two individual brain signals with respect to a left hemisphere and a right hemisphere of the subject's brain Example B28 includes the system of example B26 or any of examples B26-B40, wherein the brain signal detection device includes an electroencephalogram (EEG) sensor device comprising a first EEG electrode positioned at the first location on the subject's left-side frontal lobe and a second EEG electrode positioned at the second location on the subject's right-side frontal lobe.

Example B29 includes the system of example B28 or any of examples B26-B40, wherein the first EEG electrode is positioned at F3 and the second EEG electrode is positioned at F4.

Example B30 includes the system of example B26 or any of examples B26-B40, wherein the data processing device is configured to determine the dynamic threshold by adjusting a previous threshold value based on a ratio of coordination between frequency power in the at least two individual brain signals sampled in a corresponding previous neurofeedback period.

Example B31 includes the system of example B26 or any of examples B26-B40, wherein the data processing device is configured to determine the dynamic threshold by calculating an amount of overlap of the at least two individual brain signals in the neurofeedback period with respect to time and producing a threshold value corresponding to a percentile of the amount of overlap.

Example B32 includes the system of example B31 or any of examples B26-B40, wherein the data processing device is configured to calculate the amount of overlap involving determining a percentage of times the at least two individual brain signals peak together and the at least two individual brain signals trough together at each sampling time over the neurofeedback period and comparing the determined percentage to the percentile.

Example B33 includes the system of examples B31 or B32 or any of examples B26-B40, wherein the percentile is in a range of 10% to 40%.

Example B34 includes the system of example B26 or any of examples B26-B40, wherein the data processing device is configured to determine an optimal work-to-rest ratio based at least in part on the dynamic threshold.

Example B35 includes the system of example B26 or any of examples B26-B40, wherein the data processing device is configured to analyze frequency power of the at least two individual brain signals acquired in a frequency range between 0.1 Hz and 120 Hz.

Example B36 includes the system of example B35 or any of examples B26-B40, wherein the frequency range is between 5 Hz and 50 Hz.

Example B37 includes the system of example B26 or any of examples B26-B40, wherein the stimuli includes at least one of visual stimuli, auditory stimuli, or tactile stimuli.

Example B38 includes the system of example B26 or any of examples B26-B40, wherein the display device includes at least one of a display screen, a speaker, or a force-feedback apparatus.

Example B39 includes the system of example B26 or any of examples B26-B40, wherein the data processing device includes at least one of a desktop computer, a laptop computer, a smartphone, a tablet, a wearable smart device including a smartwatch or smartglasses, or one or more computing devices in communication with each other in a network.

Example B40 includes the system of example B26 or any of examples B26-B40, wherein the data processing device and the display device are configured in a same apparatus.

In some embodiments in accordance with the present technology (example B41), a non-transitory, computer-readable medium storing instructions thereon that, when executed by one or more processors of a computing system, cause the computing system to perform operations for analyzing and utilizing neurofeedback from brain signal data of a subject in real time, which can be implemented to promote brain coherence, where the brain signal data includes at least two individual brain signals from the subject's brain acquired from the two or more electrodes during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe where a first electrode is positioned and a second location on the subject's right-side frontal lobe where a second electrode is positioned, and where the operations include: receiving a first set of the brain signal data over a first time interval of a first neurofeedback period that follows a preliminary time interval; analyzing the first set of brain signal data by calculating an amount of overlap of the at least two individual brain signals with respect to time during the first time interval; and producing a first dynamic threshold to be a value corresponding to a percentile of the amount of overlap when a baseline threshold was satisfied by the first set of brain signal data of the first time interval, or maintaining the baseline threshold for a subsequent time interval when the baseline threshold was not satisfied by the first set of brain signal data.

Example B42 includes the non-transitory, computer-readable medium of example B41 or any of examples B41-B50, wherein the percentile is in a range of 15% to 30%.

Example B43 includes the non-transitory, computer-readable medium of example B42 or any of examples B41-B50, wherein at least one of: a time period of the first time interval includes a range of 1 minute to 5 minutes, or a sampling time of the first time interval is 0.1 second to 5 seconds.

Example B44 includes the non-transitory, computer-readable medium of example B41 or any of examples B41-B50, the operations further comprising: prior to the receiving a first set of the brain signal data over a first time interval, receiving the preliminary set of brain signal data acquired over a preliminary time interval; and analyzing the preliminary set of brain signal data to determine a baseline threshold by calculating an amount of overlap of the at least two individual brain signals with respect to time during the preliminary time interval and producing the baseline threshold to be a value corresponding to a percentile of the amount of overlap.

Example B45 includes the non-transitory, computer-readable medium of example B44 or any of examples B41-B50, wherein the percentile is in a range of 15% to 30%.

Example B46 includes the non-transitory, computer-readable medium of example B45 or any of examples B41-B50, wherein at least one of: a time period of the preliminary time interval includes a range of 30 seconds to 3 minutes, or a sampling time of the preliminary time interval includes a range of 0.1 second to 5 seconds.

Example B47 includes the non-transitory, computer-readable medium of example B41 or any of examples B41-B50, the operations further comprising: receiving a second set of the brain signal data over a second time interval of the first neurofeedback period that follows the first time interval; analyzing the second set of brain signal data by calculating an amount of overlap of the at least two individual brain signals with respect to time during the second time interval; and producing a second dynamic threshold to be a value corresponding to a percentile of the amount of overlap when the first dynamic threshold was satisfied by the second set of brain signal data of the second time interval, or maintaining the first threshold for a subsequent time interval when the first threshold was not satisfied by the second set of brain signal data.

Example B48 includes the non-transitory, computer-readable medium of example B47 or any of examples B41-B50, wherein the percentile is in a range of 15% to 30%.

Example B49 includes the non-transitory, computer-readable medium of example B48 or any of examples B41-B50, wherein at least one of: a time period of the second time interval includes a range of 1 minute to 5 minutes, or a sampling time of the second time interval is 0.1 second to 5 seconds.

Example B50 includes the non-transitory, computer-readable medium of example B47 or any of examples B41-B50, the operations further comprising: repeating receiving, analyzing, and producing or maintaining steps of example B41 for a next set of brain signal data over a next time interval of the first neurofeedback period that follows a previous time interval; implementing a first break of the one or more break periods; repeating receiving, analyzing, and producing or maintaining steps of examples B41 and B47 or examples B41-B43 and B47-B49 for a plurality of time intervals of a second neurofeedback period; and concluding the neurofeedback session.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for providing neurofeedback, comprising:

presenting, at a display device, stimuli to a subject to invoke generation of neurological signal stimulation in a brain of a subject;

measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe; and analyzing, at a data processing device in real time during the neurofeedback session, the brain signal data to determine a coherence value for a neurofeedback period of the plurality of neurofeedback periods based on a dynamic threshold, wherein the dynamic threshold is determined based at least on the coherence value from a prior neurofeedback period.

2. The method of claim 1, wherein the presenting, the measuring, and the analyzing provide a brain-computer interface (BCI) to promote brain signal coherence comprising a bilateral coordination of frequency power in the at least two individual brain signals with respect to a left hemisphere and a right hemisphere of the subject's brain.

3. The method of claim 1, wherein the dynamic threshold is determined by adjusting a previous threshold value based on a ratio of coordination between frequency power in the at least two individual brain signals sampled in a corresponding previous neurofeedback period.

4. The method of claim 1, wherein the dynamic threshold is determined by calculating an amount of overlap of the at least two individual brain signals in the neurofeedback period with respect to time and producing a threshold value corresponding to a percentile of the amount of overlap.

5. The method of claim 4, wherein the calculating the amount of overlap includes determining a percentage of times the at least two individual brain signals peak together and the at least two individual brain signals trough together at each sampling time over the neurofeedback period and comparing the determined percentage to the percentile.

6. The method of claim 1, wherein the at least two individual brain signals includes electroencephalogram (EEG) signals, and wherein a first EEG electrode is positioned at a right frontal lobe placement and a second EEG electrode is positioned at a left frontal lobe placement.

7. The method of claim 1, wherein the analyzing the brain signal data includes examining frequency power of the at least two individual brain signals acquired in a frequency range between 3 Hz and 90 Hz.

8. The method of claim 1, wherein the stimuli presented to the subject includes at least one of visual stimuli, auditory stimuli, or tactile stimuli.

9. A method for providing neurofeedback, comprising:

presenting, at a display device, stimuli to a subject to invoke generation of neurological signal stimulation in a brain of a subject;

measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe; and analyzing, at a data processing device in real time during the neurofeedback session, the brain signal data to determine a coherence value for a neurofeedback period of the plurality of neurofeedback periods based on a dynamic threshold, wherein the dynamic threshold is determined based at least on the coherence value from a prior neurofeedback period, wherein the dynamic threshold is determined by calculating an amount of overlap of the at least two individual brain signals in the neurofeedback period with respect to time and producing a threshold value corresponding to a percentile of the amount of overlap, wherein the percentile is in a range of 15% to 30%.

10. The method of claim 1, further comprising:

determining an optimal work-to-rest ratio based at least on the dynamic threshold.

11. A method for providing neurofeedback, comprising:

presenting, at a display device, stimuli to a subject to invoke generation of neurological signal stimulation in a brain of a subject;

measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe;

analyzing, at a data processing device in real time during the neurofeedback session, the brain signal data to determine a coherence value for a neurofeedback period of the plurality of neurofeedback periods based on a dynamic threshold, wherein the dynamic threshold is determined based at least on the coherence value from a prior neurofeedback period;

determining an optimal work-to-rest ratio based at least on the dynamic threshold; and extending a duration of a break period of the one or more break periods arranged between adjacent neurofeedback periods based on a decrease in a value or series of values of the dynamic threshold; or reducing a duration of a break period of the one or more break periods arranged between adjacent neurofeedback periods based on an increase in a value or series of values of the dynamic threshold.

12. A method for providing neurofeedback, comprising:

presenting, at a display device, stimuli to a subject to invoke generation of neurological signal stimulation in a brain of a subject;

measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe; and analyzing, at a data processing device in real time during the neurofeedback session, the brain signal data to determine a coherence value for a neurofeedback period of the plurality of neurofeedback periods based on a dynamic threshold, wherein the dynamic threshold is determined based at least on the coherence value from a prior neurofeedback period, wherein the analyzing the brain signal data to determine the coherence value for a neurofeedback period based on the dynamic threshold comprises:

receiving a preliminary set of brain signal data acquired over a preliminary time interval; and analyzing the preliminary set of brain signal data to determine a baseline threshold by calculating an amount of overlap of the at least two individual brain signals with respect to time during the preliminary time interval and producing the baseline threshold to be a value corresponding to a percentile in a range of 15% to 30% of the amount of overlap.

13. The method of claim 12, wherein at least one of:

a time period of the preliminary time interval includes 30 seconds to 3 minutes, or a sampling time of the preliminary time interval is 0.1 to 5 seconds.

14. The method of claim 12, wherein the analyzing the brain signal data to determine the coherence value for a neurofeedback period based on the dynamic threshold comprises:

receiving a first set of the brain signal data over a first time interval of a first neurofeedback period that follows the preliminary time interval, wherein the first time interval and the preliminary time interval are different time intervals;

analyzing the first set of brain signal data by calculating an amount of overlap of the at least two individual brain signals with respect to time during the first time interval; and producing a first dynamic threshold to be a value corresponding to a percentile in a range of 15% to 30% of the amount of overlap when the baseline threshold was satisfied by the first set of brain signal data of the first time interval, or maintaining the baseline threshold for a subsequent time interval when the baseline threshold was not satisfied by the first set of brain signal data.

15. The method of claim 14, wherein at least one of:

a time period of the first time interval includes 2 to 4 minutes, or a sampling time of the first time interval is 0.5 to 1.5 seconds.

16. The method of claim 14, wherein the analyzing the brain signal data to determine the coherence value for a neurofeedback period based on the dynamic threshold comprises:

receiving a second set of the brain signal data over a second time interval of the first neurofeedback period that follows the first time interval, wherein the second time interval, the first time interval, and the preliminary time interval are different time intervals;

analyzing the second set of brain signal data by calculating an amount of overlap of the at least two individual brain signals with respect to time during the second time interval; and producing a second dynamic threshold to be a value corresponding to a percentile in a range of 15% to 30% of the amount of overlap when the first dynamic threshold was satisfied by the second set of brain signal data of the second time interval, or maintaining the first threshold for a subsequent time interval when the first threshold was not satisfied by the second set of brain signal data.

17. The method of claim 16, wherein at least one of:

a time period of the second time interval includes 2 to 4 minutes, or a sampling time of the second time interval is 0.5 to 1.5 seconds.

18. The method of claim 14, wherein the analyzing the brain signal data to determine the coherence value for a neurofeedback period based on the dynamic threshold comprises:

repeating receiving, analyzing, and producing or maintaining steps of claim 16 for a next set of brain signal data over a next time interval of the first neurofeedback period that follows a previous time interval, wherein the next time interval and the previous time interval are different time intervals;

implementing a first break of the one or more break periods;

repeating receiving, analyzing, and producing or maintaining steps for a plurality of time intervals of a second neurofeedback period; and concluding the neurofeedback session.

19. A method for providing neurofeedback, comprising:

presenting, at a display device, stimuli to a subject to invoke generation of neurological signal stimulation in a brain of a subject;

measuring, at a brain signal detection device, a plurality of sets of brain signal data that include at least two individual brain signals from the subject's brain acquired during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe and a second location on the subject's right-side frontal lobe;

analyzing, at a data processing device in real time during the neurofeedback session, the brain signal data to determine a coherence value for a neurofeedback period of the plurality of neurofeedback periods based on a dynamic threshold, wherein the dynamic threshold is determined based at least on the coherence value from a prior neurofeedback period; and controlling, at the data processing device, the presentation of the stimuli, by the display device, during the plurality of neurofeedback periods based on the coherence value, wherein, when the coherence value is determined to not satisfy the dynamic threshold, the stimuli is adjusted by at least temporarily discontinuing the presentation and/or altering content of the presentation, and/or wherein when the coherence value is determined to satisfy the dynamic threshold, the stimuli is adjusted by at least temporarily continuing the presentation and/or altering the content of the presentation.

20. A non-transitory, computer-readable medium storing instructions thereon that, when executed by one or more processors of a computing system, cause the computing system to perform operations for analyzing and utilizing neurofeedback from brain signal data of a subject in real time, the brain signal data including at least two individual brain signals from the subject's brain acquired from two or more electrodes during a neurofeedback session having a plurality of neurofeedback periods without acquiring the at least two individual brain signals during one or more break periods arranged between adjacent neurofeedback periods, wherein each of the at least two individual brain signals correspond to at least two locations on the subject's brain including a first location on the subject's left-side frontal lobe where a first electrode is positioned and a second location on the subject's right-side frontal lobe where a second electrode is positioned, the operations comprising:

receiving a first set of the brain signal data over a first time interval of a first neurofeedback period that follows a preliminary time interval, wherein the first time interval and the preliminary time interval are different time intervals;

analyzing the first set of brain signal data by calculating an amount of overlap of the at least two individual brain signals with respect to time during the first time interval; and producing a first dynamic threshold to be a value corresponding to a percentile of the amount of overlap when a baseline threshold was satisfied by the first set of brain signal data of the first time interval, or maintaining a baseline threshold for a subsequent time interval when the baseline threshold was not satisfied by the first set of brain signal data, wherein the subsequent time interval and the first time interval are different time intervals.

21. The non-transitory, computer-readable medium of claim 20, the operations further comprising:

prior to the receiving the first set of the brain signal data over the first time interval, receiving a preliminary set of brain signal data acquired over the preliminary time interval; and analyzing the preliminary set of brain signal data to determine a baseline threshold by calculating an amount of overlap of the at least two individual brain signals with respect to time during the preliminary time interval and producing the baseline threshold to be a value corresponding to a percentile of the amount of overlap.

22. The non-transitory, computer-readable medium of claim 20, the operations further comprising:

receiving a second set of the brain signal data over a second time interval of the first neurofeedback period that follows the first time interval, wherein the second time interval, the first time interval, and the preliminary time interval are different time intervals;

analyzing the second set of brain signal data by calculating an amount of overlap of the at least two individual brain signals with respect to time during the second time interval; and producing a second dynamic threshold to be a value corresponding to a percentile of the amount of overlap when the first dynamic threshold was satisfied by the second set of brain signal data of the second time interval, or maintaining the first dynamic threshold for a subsequent time interval when the first threshold was not satisfied by the second set of brain signal data.

* * * * *